US011312436B2

(12) United States Patent
Mcginn

(10) Patent No.: US 11,312,436 B2
(45) Date of Patent: Apr. 26, 2022

(54) OBSTACLE CROSSING ROBOT

(71) Applicant: The Provost, Fellows, Foundation Scholars, and the Other Members of Board, of the College of the Holy and Undivided Trinity of Queen Elizabeth, Near Dublin, Dublin (IE)

(72) Inventor: Conor Mcginn, Dublin (IE)

(73) Assignee: THE PROVOST, FELLOWS, FOUNDATION SCHOLARS, AND THE OTHER MEMBERS OF BOARD, OF THE COLLEGE OF THE HOLY AND UNDIVIDED TRINITY OF QUEEN ELIZABETH, NEAR DUBLIN, Dublin (IE)

( * ) Notice: Subject to any disclaimer, the term of this patent is extended or adjusted under 35 U.S.C. 154(b) by 836 days.

(21) Appl. No.: 16/090,471

(22) PCT Filed: Mar. 31, 2017

(86) PCT No.: PCT/EP2017/057779
§ 371 (c)(1),
(2) Date: Oct. 1, 2018

(87) PCT Pub. No.: WO2017/168000
PCT Pub. Date: Oct. 5, 2017

(65) Prior Publication Data
US 2019/0118881 A1   Apr. 25, 2019

(30) Foreign Application Priority Data

Apr. 1, 2016  (GB) .............................. GB1605612.9

(51) Int. Cl.
| B62D 57/024 | (2006.01) |
| B62D 57/028 | (2006.01) |
| B60B 19/00 | (2006.01) |

(52) U.S. Cl.
CPC .......... B62D 57/024 (2013.01); B60B 19/003 (2013.01); B62D 57/028 (2013.01)

(58) Field of Classification Search
CPC .... B62D 57/24; B62D 57/028; B62D 57/022; B62D 61/125; B60B 19/003
See application file for complete search history.

(56) References Cited

U.S. PATENT DOCUMENTS 5,515,934 A   5/1996  Davis
5,579,857 A   12/1996 Abe et al.
(Continued)

FOREIGN PATENT DOCUMENTS

GB   2201926 A    9/1988
JP   S60215480 A  10/1985
(Continued)

OTHER PUBLICATIONS

International Search Report and Written Opinion for PCT/EP2017/057779, dated Jul. 7, 2017, 10 pages.
(Continued)

*Primary Examiner* — Minnah L Seoh
*Assistant Examiner* — Harold Eric Pahlck, III
(74) *Attorney, Agent, or Firm* — Hoffman Warnick LLC

(57) ABSTRACT

A robot is provided, the robot comprising a body carrying a first drive arrangement, a second drive arrangement and a stabiliser. The robot further comprises actuators operable to cause relative movement of the first drive arrangement, the second drive arrangement and the stabiliser, and to drive the first and the second drive arrangements. The robot is arrangeable in first, second and third configurations each having static stability. In the first configuration, the stabiliser and the first drive arrangement are arranged to contact the ground. In the second configuration, the stabiliser and the second drive arrangement are arranged to contact the
(Continued)

Figure 1A:
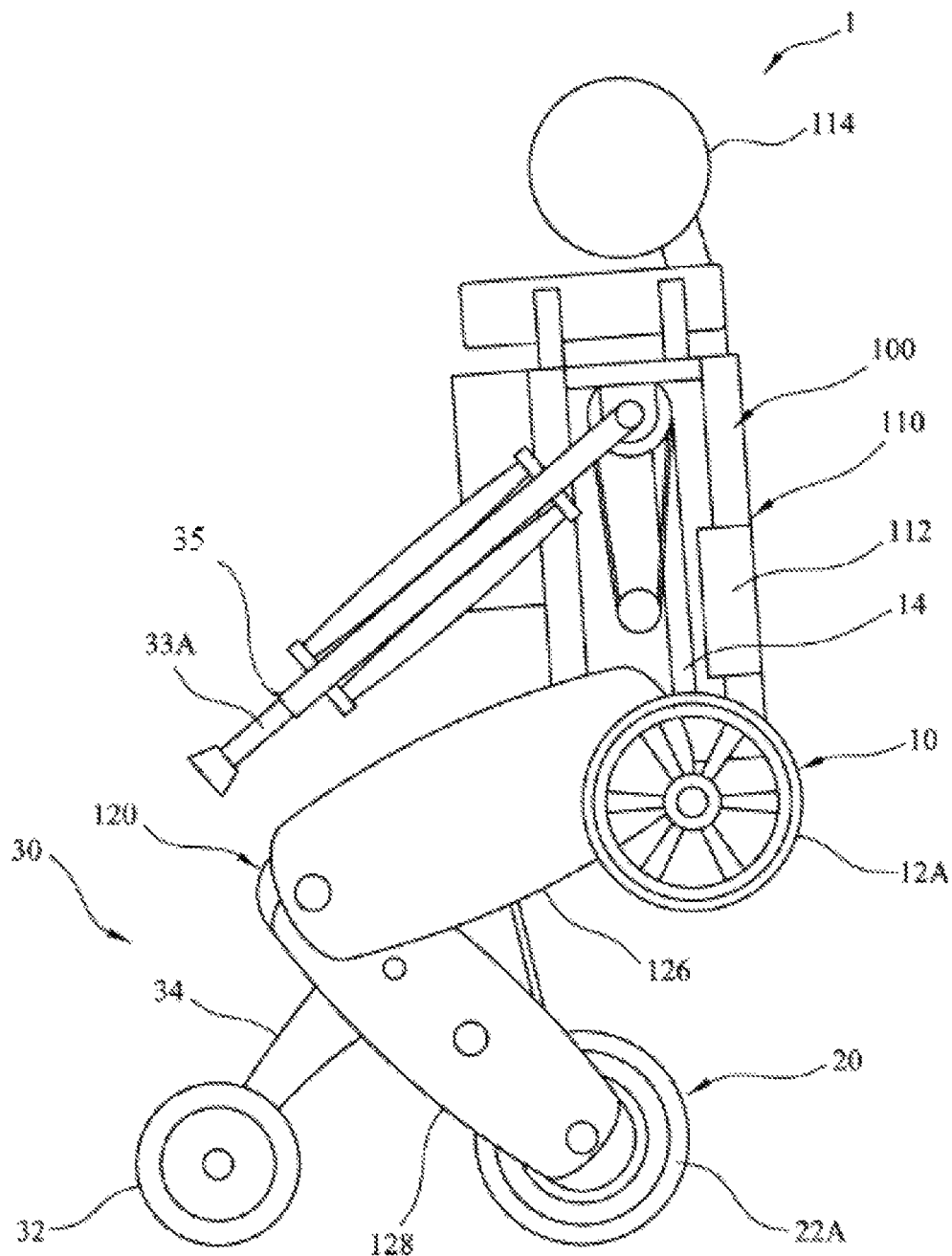

ground. In the third configuration, the first and the second drive arrangements are arranged to contact the ground. No other ground contacting point is involved in conferring said static stability in said configurations.

16 Claims, 21 Drawing Sheets

(56) References Cited

U.S. PATENT DOCUMENTS

| | | | | |
|---|---|---|---|---|
| 7,348,747 B1* | 3/2008 | Theobold | ............... | B25J 5/005 318/568.11 |
| 7,649,331 B2* | 1/2010 | Hosoda | ............... | B25J 5/007 318/568.12 |
| 2005/0023052 A1* | 2/2005 | Beck | ............... | B60K 17/046 180/24.07 |
| 2006/0151218 A1 | 7/2006 | Goren et al. | | |
| 2009/0114460 A1* | 5/2009 | Amino | ............... | B62D 57/028 180/8.3 |
| 2012/0175172 A1* | 7/2012 | Bouhraoua | ............... | B62B 5/02 180/8.2 |

FOREIGN PATENT DOCUMENTS

| | | |
|---|---|---|
| JP | 62026174 | 2/1987 |
| JP | 402003577 | 1/1990 |
| JP | 2006190105 A | 7/2006 |
| TW | 201529390 A | 1/2015 |
| WO | 2008076193 A2 | 6/2008 |
| WO | 2008090508 A1 | 7/2008 |

OTHER PUBLICATIONS

Great Britain Combined Search and Examination Report for Application No. GB1605612.9, dated Sep. 30, 2016, 5 pages.

Osamu Matsumoto et al., "A four-wheeled Robot to Pass over Steps by Changing Running Control Modes," Mechanical Engineering Laboratory, MITI, University of Tsukuba, IEEE International Conference on Robotics and Automation, 1995, 7 pages.

Tsagarakis et al., "Compliant Humanoid COMAN: Optimal Joint Stiffness Tuning for Modal Frequency Control," Istituto Italiano di Tecnologia (IIT), IEEE International Conference on Robotics and Automation (ICRA) May 6-10, 2013, 6 pages.

Lawn et al., "Modeling of a Stair-Climbing Wheelchair Mechanism With High Single-Step Capability," IEEE Transactions on Neural Systems and Rehabilitation Engineering, vol. 11, No. 3, Sep. 2003, 10 pages.

Ruiken et al., "Postural Modes and Control for Dexterous Mobile Manipulation: the Umass UBot Concept," Laboratory for Perceptual Robotics, School of Computer Science, University of Massachusetts Amherst, 6 pages.

Fuch et al., "Rollin' Justin—Design considerations and realization of a mobile platform for a humanoid upper body," German Aerospace Center, Institute of Robotics and Mechatronics, 2009, 7 pages.

Hobbelen et al., "System overview of bipedal robots Flame and TUlip: tailor-made for Limit Cycle Walking," IEEE/RSJ International Conference on Intelligent Robots and Systems Acropolis Convention Center, Sep. 22-26, 2008, pp. 2486-2491.

* cited by examiner

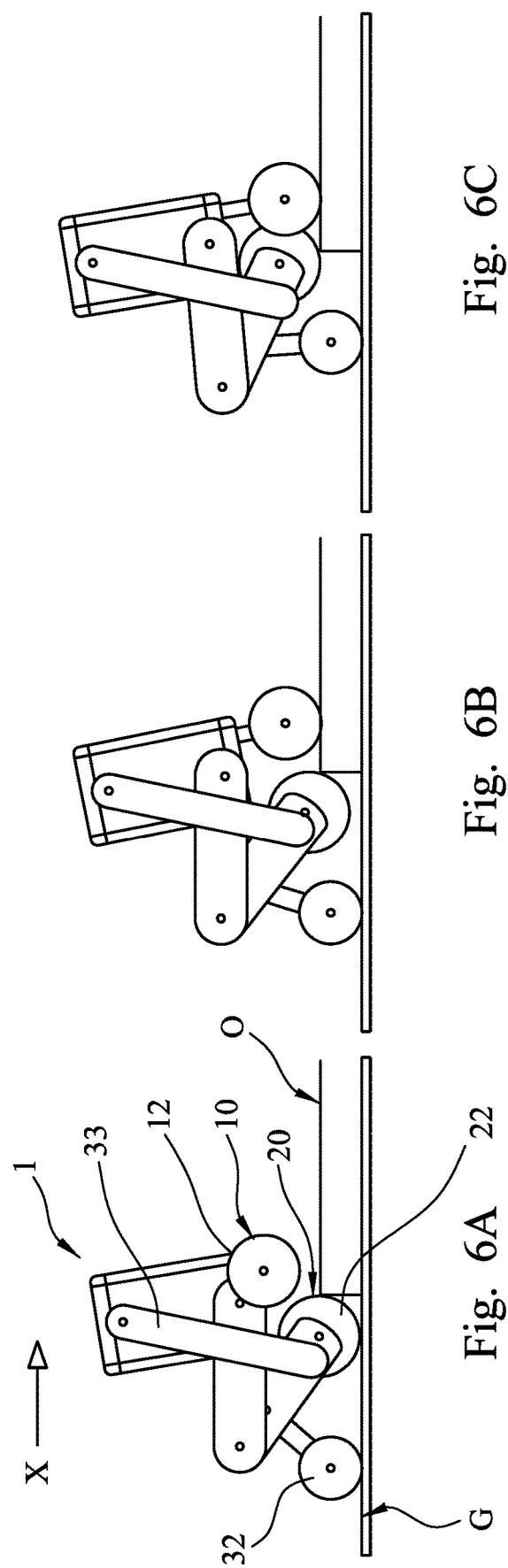
Fig. 6A   Fig. 6B   Fig. 6C
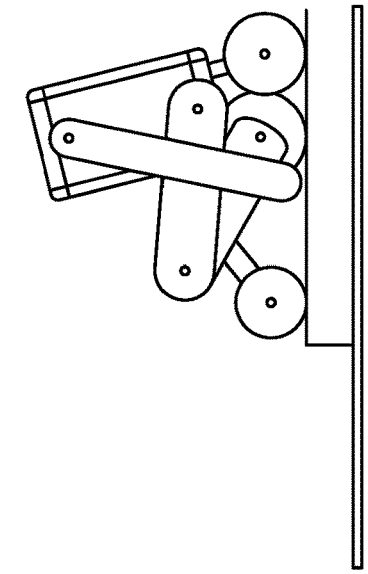
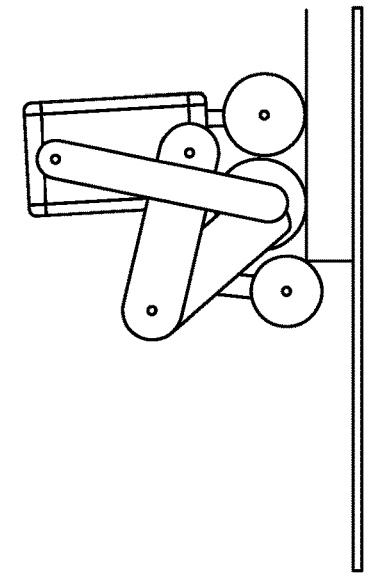
Fig. 6D   Fig. 6E   Fig. 6F

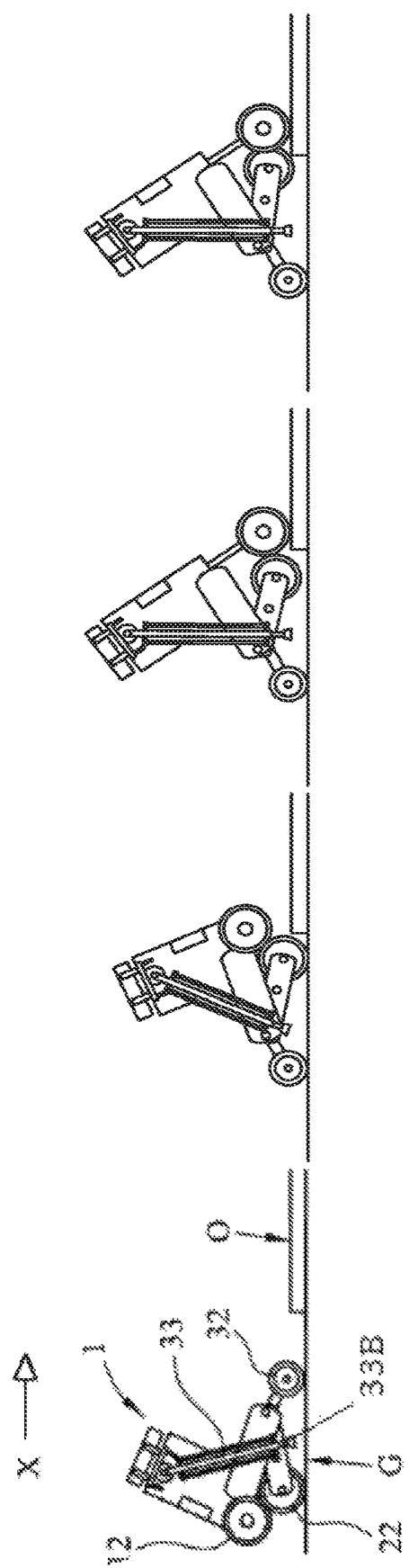
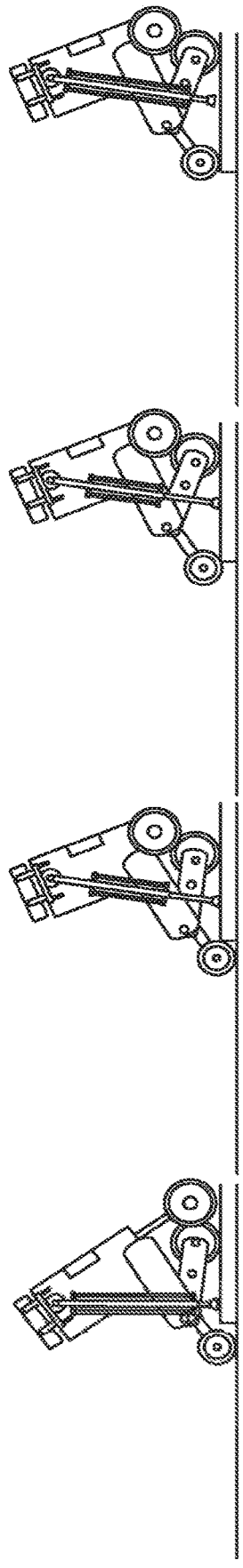

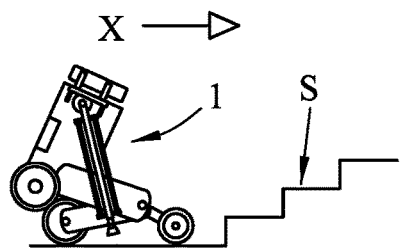
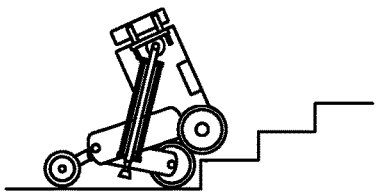
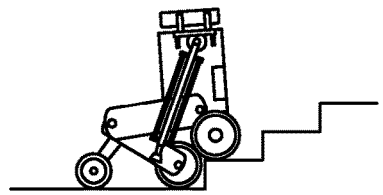
Fig. 11A    Fig. 11B    Fig. 11C
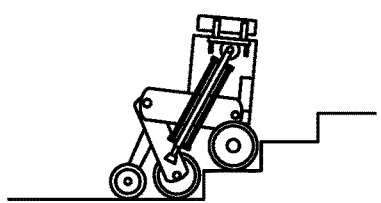
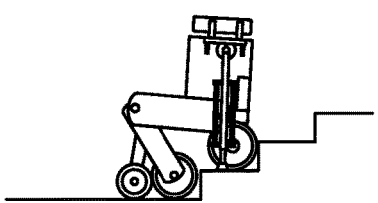
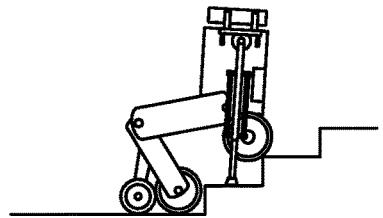
Fig. 11D    Fig. 11E    Fig. 11F
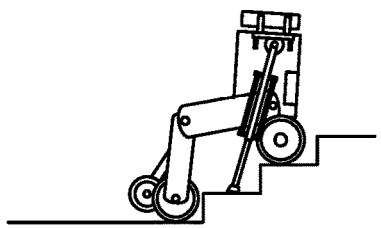
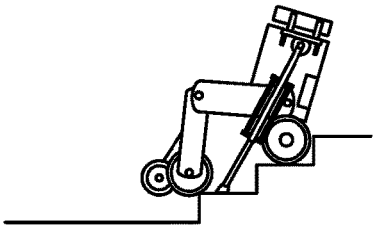
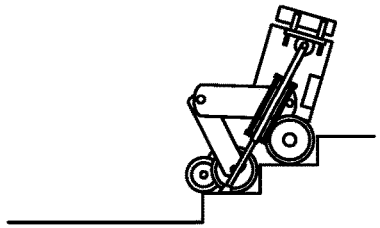
Fig. 11G    Fig. 11H    Fig. 11I
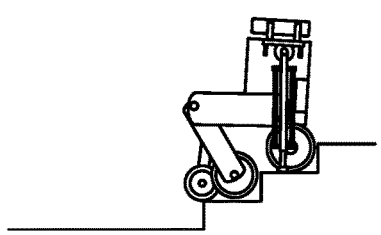
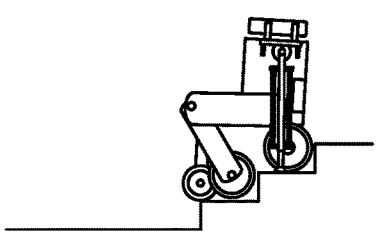
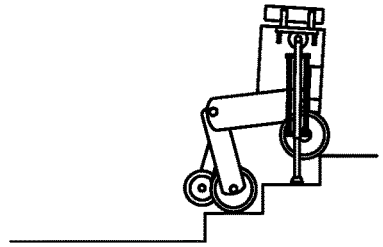
Fig. 11J    Fig. 11K    Fig. 11L

OBSTACLE CROSSING ROBOT

FIELD OF THE INVENTION

The present invention relates to robots, and to robot locomotion across obstacles, such as stairs.

BACKGROUND TO THE INVENTION

Known robots arranged to move across obstacles, such as stairs or crevices, typically have a relatively high number of degrees of freedom. That typically leads to relatively high mechanical complexity. For example, humanoid biped robots may have more than twenty degrees of freedom for movement, for example locomotion. Such robots usually require many actuators, for example motors, for movement, for example locomotion, and thus have relatively high energy consumption. Also, incorporating many actuators increases the mass of a robot, thereby increasing inertia, which in turn requires additional power. Further, such robots having a high number of degrees of freedom require greater control complexity, so as to coordinate movements about the various degrees of freedom, which may be computationally expensive.

Robots arranged to move across obstacles and/or perform tasks in human environments, for example indoor environments, domestic environments, commercial environments, industrial environments and the like are typically of human proportions, enabling them to manoeuvre and/or perform tasks, for example manipulate objects or interact with people, in these environments with a good balance of speed and control. Typically, such robots are statically unstable, requiring continuous operation of feedback control systems in order to maintain control during locomotion. Statically unstable robots may be computationally more expensive and have higher power consumption. In contrast, robots having static stability tend to be less suitable for human environments, typically having relatively lower terrain adaptability.

Example embodiments of the present invention aim to address at least one of the issues identified above, or related issues.

SUMMARY OF THE INVENTION

According to a first aspect of the invention, there is provided a robot comprising:

a body carrying a first drive arrangement, a second drive arrangement and a stabiliser; and further comprising actuators operable to cause relative movement of the first drive arrangement, the second drive arrangement and the stabiliser, and to drive the first and the second drive arrangements;

wherein the robot is arrangeable in first, second and third configurations each having static stability, such that:

in the first configuration, the stabiliser and the first drive arrangement are arranged to contact the ground;

in the second configuration, the stabiliser and the second drive arrangement are arranged to contact the ground; and in the third configuration, the first and the second drive arrangements are arranged to contact the ground;

characterised in that no other ground contacting point is involved in conferring said static stability in said configurations.

In this way, the robot is arrangeable to better move across obstacles, such as stairs, in human environments, such as indoor environments. Particularly, since the robot is arrangeable in the first, second and third configurations each having static stability, the robot may maintain static stability during locomotion, for example, across objects. Since the first, second and third configurations each have static stability, closed-loop feedback control, for example active control, of the robot is not required to maintain an orientation in these configurations, as discussed below. In this way a control requirement, for example a computational requirement, may be reduced or sensors required for closed-loop feedback control, for example active control, may not be required. Furthermore, since active control may not be required and thus actuation of the actuators may not be required so as to maintain stability, energy consumption of the robot may be reduced. In addition, since the robot is arrangeable in the first, second and third configurations each having static stability, the robot may be arrangeable to move between these configurations. For example, the robot may be arrangeable to move from the first configuration to the second configuration or the third configuration or vice versa. For example, the robot may be arrangeable to move from the second configuration to the third configuration or vice versa. Particularly, the robot may be arrangeable in one of the first configuration, the second configuration or the third configuration having static stability while moving to another of these configurations. That is, the robot may be arrangeable to maintain static stability during locomotion, for example, across obstacles. In this way, the robot may be better able to perform tasks such as move across soft or broken terrain, climb obstacles, cross crevices or ascend or descend stairs.

As will be understood by the person skilled in the art, stability relates to an ability of the robot to maintain an orientation, for example remain upright, when at rest or during locomotion.

Static stability may be achieved according to a structural arrangement of the robot whereby the robot maintains an orientation in an open-loop manner, when at rest or during locomotion. That is, a centre of gravity of the robot is within a polygon of support of the robot defined by points of the robot in contact with the ground in the first, second and third configurations. As will be understood by the person skilled in the art, the polygon of support relates to an area of projection of the first drive arrangement, the second drive arrangement or the stabiliser arranged to contact the ground in the first, second and third configurations, as detailed above.

In contrast, dynamic stability may be achieved through closed-loop control of the robot, for example sensor feedback control of the actuators, whereby the robot maintains an orientation actively, when at rest or during locomotion. That is, the centre of gravity of the robot may not be within the polygon of support, and actuation of the actuators is required to maintain or tend to maintain the orientation.

It should be understood that the first configuration, the second configuration and the third configuration are distinct, for example different, configurations of the robot.

Particularly, in the first configuration, the stabiliser and the first drive arrangement are arranged to contact the ground whereby the robot has static stability and wherein the static stability in the first configuration is conferred exclusively by the stabiliser and the first drive arrangement. That is, in the first configuration, the second drive arrangement is arranged to not contact the ground, for example the second drive arrangement is arranged above the ground). Furthermore no other point of the robot is arranged to contact the ground. That is, in the first configuration, the polygon of support of the robot is defined by the stabiliser and the first drive arrangement. That is, in the first configuration, the centre of gravity of the robot is within the polygon of support of the robot defined by the stabiliser and the first drive arrangement.

Further, in the second configuration, the stabiliser and the second drive arrangement are arranged to contact the ground whereby the robot has static stability and wherein static stability in the second configuration is conferred exclusively by the stabiliser and the second drive arrangement. That is, in the second configuration, the first drive arrangement is arranged to not contact the ground, for example the first drive arrangement is arranged above the ground). Furthermore, no other point of the robot is arranged to contact the ground. That is, in the second configuration, the polygon of support of the robot is defined by the stabiliser and the second drive arrangement. That is, in the second configuration, the centre of gravity of the robot is within the polygon of support of the robot defined by the stabiliser and the second drive arrangement.

Additionally, in the third configuration, the first drive arrangement and the second drive arrangement are arranged to contact the ground whereby the robot has static stability and wherein static stability in the third configuration is conferred exclusively by the first drive arrangement and the second drive arrangement. That is, in the third configuration, the stabiliser is arranged to not contact the ground, for example the stabiliser is arranged above the ground). Furthermore, no other point of the robot is arranged to contact the ground. That is, in the third configuration, the polygon of support of the robot is defined by the first drive arrangement and the second drive arrangement. That is in the third configuration, the centre of gravity of the robot is within the polygon of support of the robot defined by the first drive arrangement and the second drive arrangement.

It should be understood that the term body is not limiting to anthropomorphic forms and may comprise any structure suitable for carrying the first drive arrangement, the second drive arrangement and the stabiliser together with the actuators.

Furthermore, it should be understood that the first drive arrangement and the second drive arrangement, together with the actuators, are arrangeable to provide locomotion of the robot. Thus, the first drive arrangement and the second drive arrangement may comprise, for example, means for providing motion, such as one or more wheels or one or more tracks. In contrast, it should be understood that the first drive arrangement or the second drive arrangement do not comprise means for providing reciprocating motion, such as legs.

In addition, it should be understood that the actuators, for example one or more actuators, are means for driving the first drive arrangement and the second drive arrangement. For example, the actuators may comprise electric motors such as rotational motors or linear motors, or pneumatic or hydraulic actuators.

In one example embodiment, the robot is driveable in the first, the second and the third configurations. That is, the actuators are arranged to drive the first drive arrangement or the second drive arrangement in the first configuration, the second configuration and the third configuration. Further, since the first configuration, the second configuration and the third configuration have static stability, the robot maintains static stability during locomotion in these configurations.

In one example embodiment:
in the first configuration, the stabiliser is arranged to contact the ground on a first plane and the first drive arrangement is arranged to contact the ground on a second plane;
in the second configuration, the stabiliser is arranged to contact the ground on the first plane and the second drive arrangement is arranged to contact the ground on the second plane; and
in the third configuration, the first drive arrangement is arranged to contact the ground on the first plane and the second drive arrangement is arranged to contact the ground on the second plane.

It should be understood that the first plane and the second plane are planes of the ground. For example, the first plane may be a floor and the second plane may be a tread, for example of a stair. Conversely, the first plane may be the tread and the second plane may be the floor. Furthermore, the first plane may be, for example, a first tread of stairs and the second plane may be a second tread of the stairs, in which the second tread is located above the first tread, and in which the second tread is not limited to being adjacent to the first tread.

Thus, for example, in the first configuration, the stabiliser may be arranged to contact the floor and the first drive arrangement may be arranged to contact the tread. Conversely, the first configuration, the stabiliser may be arranged to contact the tread and the first drive arrangement may be arranged to contact the floor. For example, in the second configuration, the stabiliser may be arranged to contact the floor and the second drive arrangement may be arranged to contact the tread. Conversely, in the second configuration, the stabiliser may be arranged to contact the tread and the second drive arrangement may be arranged to contact the floor. For example, in the third configuration, the first drive arrangement may be arranged to contact the floor and the second drive arrangement may be arranged to contact the tread. Conversely, in the third configuration, the first drive arrangement may be arranged to contact the tread and the second drive arrangement may be arranged to contact the floor.

Since the robot has static stability in the first configuration, the second configuration and the third configuration, the robot is arrangeable to maintain static stability while, for example, arranged on different planes of the ground. In this way, the robot may be better adapted to move between the first plane and the second plane. For example, the robot may be better adapted to ascend or descend stairs.

In one example embodiment, the first plane and the second plane are coincident.

That is, the first plane and the second plane are in the same plane. However, the first plane and the second plane may be separated by a region of unevenness, for example, by a crevice or a barrier. In this way, the robot may be better adapted to move across crevices or barriers.

In one example embodiment, the body comprises:
a first body section carrying the first drive arrangement;
a second body section carrying the second drive arrangement;
wherein the actuators are operable to cause relative movement of body sections;
wherein:
in the first configuration, the stabiliser is arranged to contact the ground either forwardly or rearwardly of the first drive arrangement; and in the second configuration, the stabiliser is arranged to contact the ground either forwardly or rearwardly of the second drive arrangement.

That is, the first body section and the second body section are arrangeable in a variably spaced relationship. It should be understood that forwardly or rearwardly may be defined relative to a direction of locomotion of the robot or relative to an arrangement of the first drive arrangement or the second drive arrangement with respect to the robot, for example an orientation of the robot. Thus, forwardly may be defined as being in a direction X while conversely, rearwardly may be defined as an opposed direction Y.

In this way, the robot may be better adapted to move between the first configuration, the second configuration or the third configuration, for example, during locomotion. Furthermore, since the robot has static stability in the first configuration and in the second configuration, the static stability may be maintained during this process of moving between the configurations.

In one example embodiment, the first drive arrangement is carried on a mount that is extensible from the body.

That is, the first drive arrangement may be arranged relatively closer to the body and relatively further from the body. That is, the first drive arrangement is arrangeable in a variably spaced relationship with respect to the body. In this way, the robot may be better adapted for locomotion between planes. Further, the robot may be better adapted to adopt an improved polygon of support in the first configuration or the third configuration. In addition, the robot may be better adapted to move from the second configuration to the first configuration or the third configuration.

In one example embodiment, the robot is operable to perform a stair climbing operation, wherein:
the stabiliser comprises an arm that is arrangeable to provide ground-contacting support during stair-climbing; wherein:
the arm is arrangeable to contact a stair tread rearwardly of the first drive arrangement as the first drive arrangement is raised toward the next stair tread in a first phase of stair climbing; and
the arm is further arrangeable to contact the stair tread forwardly of the second drive arrangement as the second drive arrangement is driven forward and up onto the stair tread in a second phase of stair climbing;
such that in both first and second phases of stair climbing, contact of the arm on the stair tread provides the robot with static stability.

It should be understood that stair climbing may include ascending a stair or stairs or descending a stair or stairs. It should be understood that the term arm is not limiting and thus may comprise a strut or a tie that may be, for example, extended or retracted or rotated or articulated.

Particularly, during ascending or descending a stair or stairs, an angle of inclination of the robot may be such that the centre of gravity of the robot may be outside of a polygon of support of the robot defined by the first drive arrangement, the second drive arrangement or the stabiliser, as discussed previously. Hence, the arm is a point of the robot in contact with the ground and thus a point included in a polygon of support of the robot. In this way, static stability of the robot may be achieved during ascending or descending a stair or stairs.

In this way, the robot may be better adapted to ascend or descend a stair or stairs since the arm may be arranged to define an appropriate polygon of support of the robot.

In one example embodiment, the robot is operable to perform an obstacle crossing operation, wherein:
the stabiliser is arranged to provide ground-contacting support during first and second phases of obstacle crossing; wherein:
the stabiliser is arranged to contact the ground rearwardly of the second drive arrangement as the first drive arrangement passes over the obstacle in a first phase of obstacle crossing; and
the first drive arrangement is arrangeable to contact the ground beyond the obstacle, forwardly of the second drive arrangement, as the second drive arrangement passes over the obstacle in a second phase of obstacle crossing;
such that in both first and second phases of obstacle crossing, contact of the stabiliser on the ground provides the robot with static stability.

In this way, the robot may be better adapted to cross unevenness. In this way, the robot may be better adapted to move across barriers.

In one example embodiment, the robot is arrangeable in a fourth configuration having static stability, wherein:
in the fourth configuration, the first drive arrangement and the second drive arrangement are arranged to contact the ground;
and the stabiliser is arranged to contact the ground.

In one example embodiment, the robot is driveable in the fourth configuration.

In this way, the robot may be better adapted to move across, for example, soft or broken terrain.

According to a second aspect of the invention, there is provided a method of operating a robot, the robot comprising:
a body carrying a first drive arrangement, a second drive arrangement and a stabiliser; and further comprising actuators operable to cause relative movement of the first drive arrangement, the second drive arrangement and the stabiliser, and to drive the first and the second drive arrangements;
wherein the robot is arrangeable in first, second and third configurations each having static stability;
the method comprising:
in the first configuration, arranging the stabiliser and the first drive arrangement to contact the ground;
in the second configuration, arranging the stabiliser and the second drive arrangement to contact the ground; and
in the third configuration, arranging the first and the second drive arrangements to contact the ground;
characterised in that no other ground contacting point is involved in conferring said static stability in said configurations.

In one example embodiment, the method comprises:
driving the robot in the first, the second or the third configurations.

In one example embodiment,
in the first configuration, the arranging comprises arranging the stabiliser to contact the ground on a first plane and arranging the first drive arrangement to contact the ground on a second plane;
in the second configuration, the arranging comprises arranging the stabiliser to contact the ground on the first plane and arranging the second drive arrangement to contact the ground on the second plane; and
in the third configuration, the arranging comprises arranging the first drive arrangement to contact the ground on the first plane and arranging the second drive arrangement to contact the ground on the second plane.

In one example embodiment, the first plane and the second plane are coincident.

In one example embodiment, the body comprises:
a first body section carrying the first drive arrangement;
a second body section carrying the second drive arrangement;
wherein the actuators are operable to cause relative movement of body sections;
wherein:
in the first configuration, the arranging comprises arranging the stabiliser to contact the ground either forwardly or rearwardly of the first drive arrangement; and
in the second configuration, the arranging comprises arranging the stabiliser to contact the ground either forwardly or rearwardly of the second drive arrangement.

In one example embodiment, the first drive arrangement is carried on a mount that is extensible from the body.

In one example embodiment, the robot is operable to perform a stair climbing operation, wherein:
the stabiliser comprises an arm that is arrangeable to provide ground-contacting support during stair-climbing;
wherein the method comprises:
arranging the arm to contact a stair tread rearwardly of the first drive arrangement as the first drive arrangement is raised toward the next stair tread in a first phase of stair climbing; and
arranging the arm to contact the stair tread forwardly of the second drive arrangement as the second drive arrangement is driven forward and up onto the stair tread in a second phase of stair climbing;
such that in both first and second phases of stair climbing, contact of the arm on the stair tread provides the robot with static stability.

In one example embodiment, the robot is operable to perform an obstacle crossing operation, wherein:
the stabiliser is arrangeable to provide ground-contacting support during first and second phases of obstacle crossing;
wherein the method comprises:
arranging the stabiliser to contact the ground rearwardly of the second drive arrangement as the first drive arrangement passes over the obstacle in a first phase of obstacle crossing; and
arranging the first drive arrangement to contact the ground beyond the obstacle, forwardly of the second drive arrangement, as the second drive arrangement passes over the obstacle in a second phase of obstacle crossing;
such that in both first and second phases of obstacle crossing, contact of the stabiliser on the ground provides the robot with static stability.

In one example embodiment, the robot is arrangeable in a fourth configuration having static stability, wherein the method comprises:
in the fourth configuration, arranging the first drive arrangement and the second drive arrangement to contact the ground;
and arranging the stabiliser to contact the ground.

In one example embodiment, the method comprises driving the robot in the fourth configuration.

According to the present invention there is provided an apparatus as set forth in the appended claims. Other features of the invention will be apparent from the dependent claims, and the description which follows.

BRIEF INTRODUCTION TO THE DRAWINGS

Figure 1B:
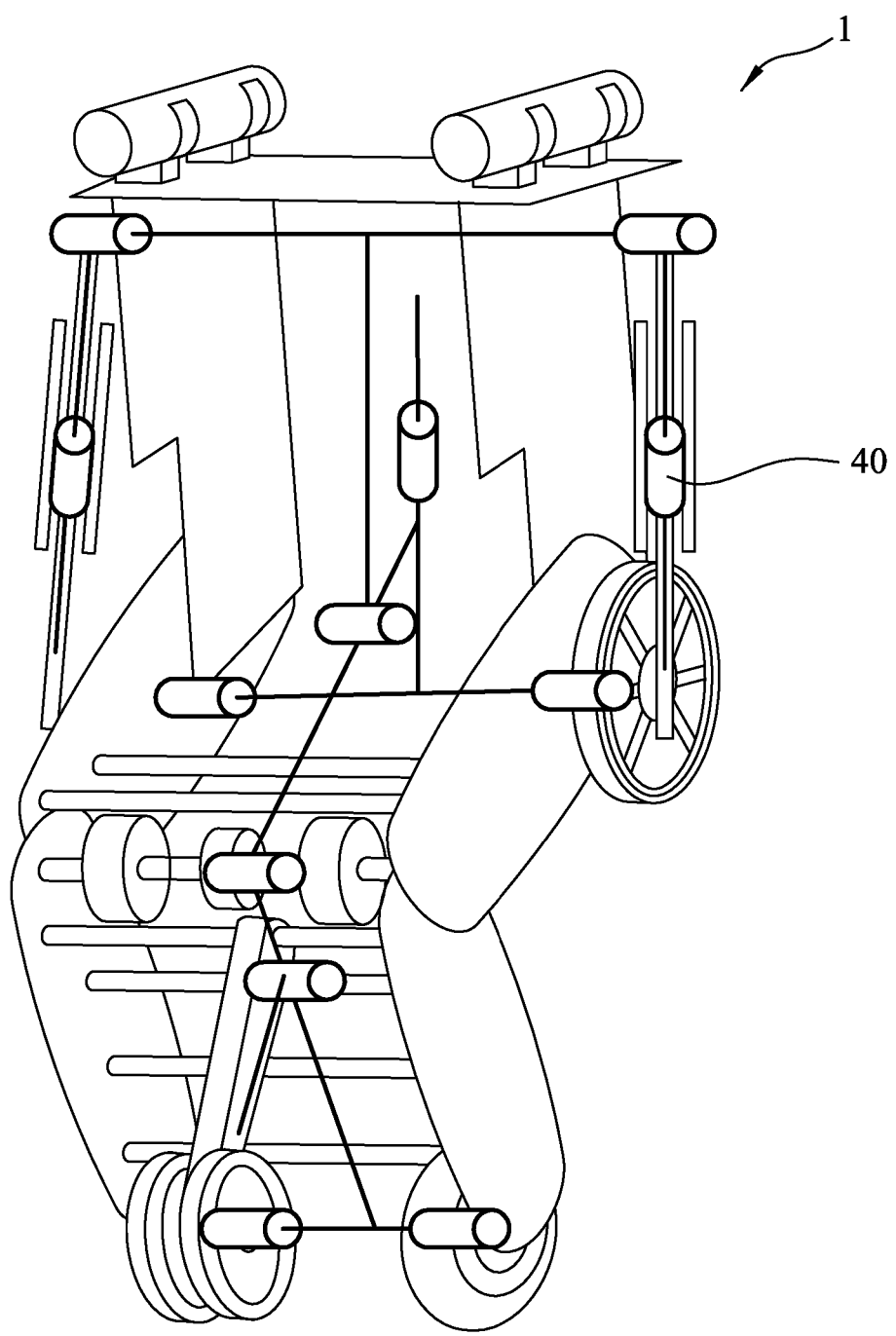
Figures 3A, 3B:
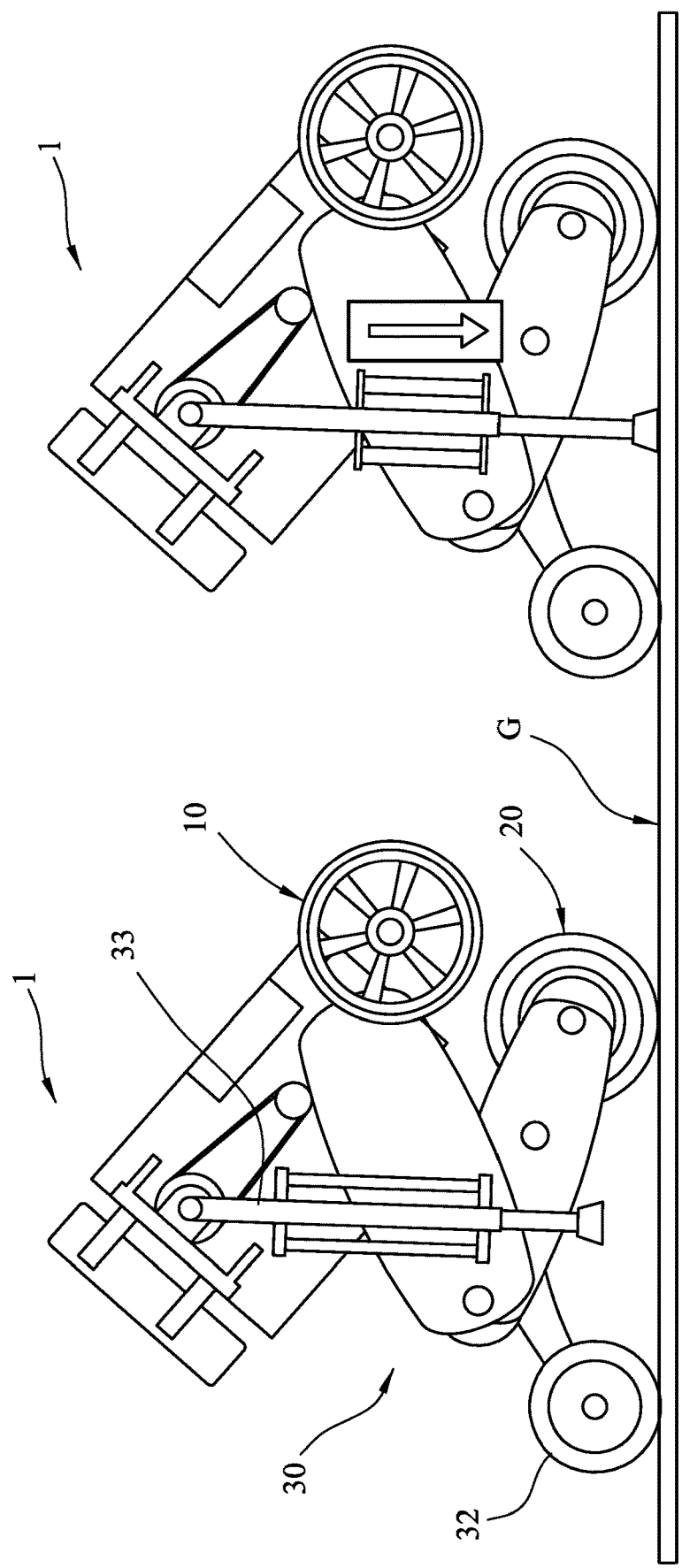
Figures 4A, 4B:
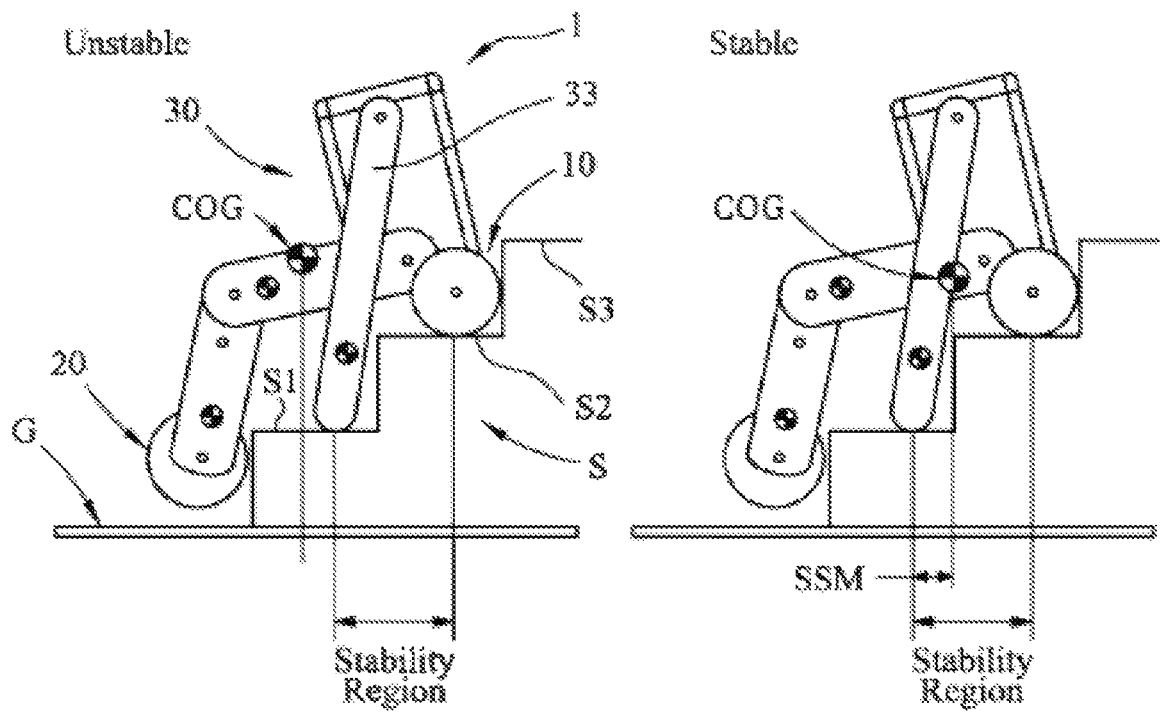
Figures 5A, 5B:
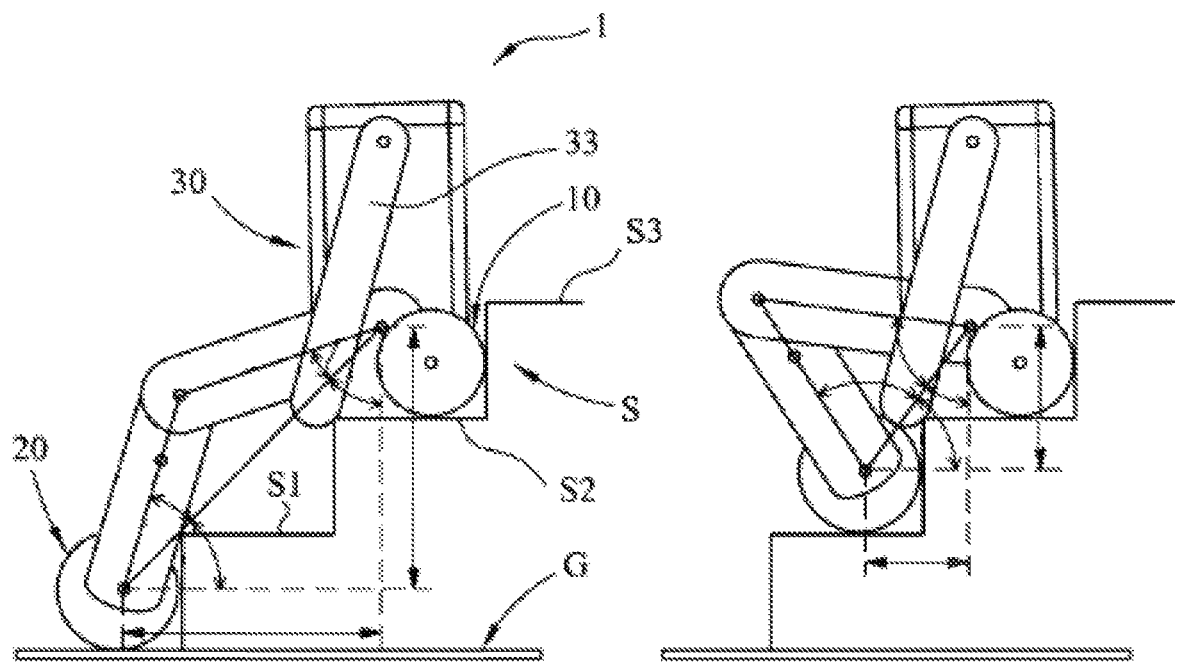
Figures 14A, 14B, 14C:
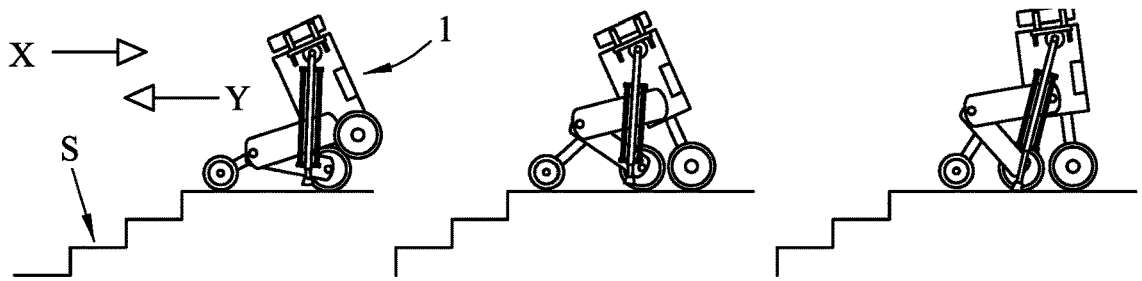
Figures 14M, 14O, 114N:
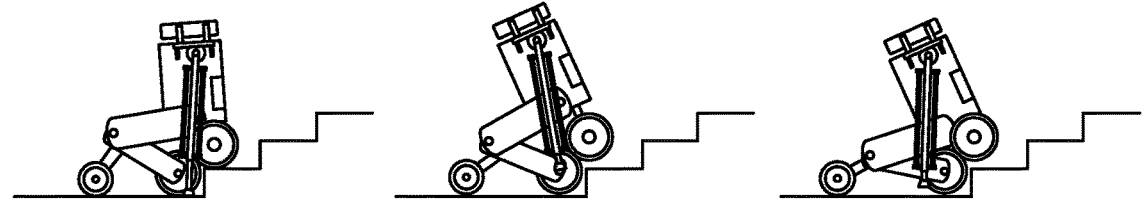
Figure 15:
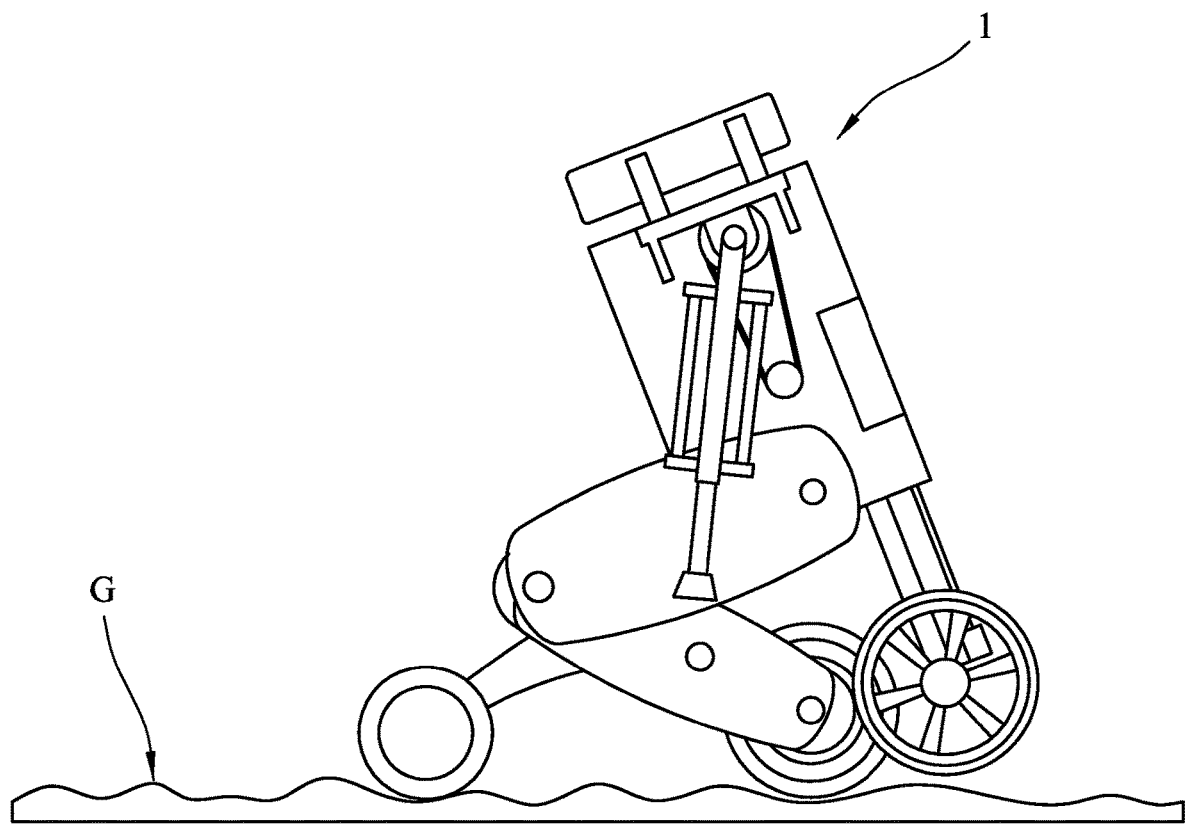

For a better understanding of the invention, and to show how embodiments of the same may be carried into effect, reference will now be made, by way of example, to the accompanying diagrammatic drawings in which:

FIG. 1A shows a schematic side view of a robot according to an example embodiment;
FIG. 1B shows a schematic semi-transparent perspective view of the robot of FIG. 1A;
FIG. 2A-2D shows schematic perspective views of the robot of FIG. 1, in use;
FIG. 3A-3B shows schematic side views of a simplified representation of the robot of FIG. 1, in use;
FIG. 4A-4B shows schematic side views of a simplified representation of the robot of FIG. 1, in use;
FIG. 5A-5B shows schematic side views of a simplified representation of the robot of FIG. 1, in use;
FIG. 6A-6F shows schematic side views of a simplified representation of the robot of FIG. 1, in use;
FIG. 7A-7H shows side views of a robot according to an example embodiment, in use;
FIG. 8A-8H shows schematic side views of a simplified representation of the robot of FIG. 1, in use;
FIG. 9A-9H shows schematic side views of a simplified representation of the robot of FIG. 1, in use;
FIG. 10A-10F shows schematic side views of a simplified representation of the robot of FIG. 1, in use;
FIG. 11A-11T shows side views of the robot of FIG. 7, in use;
FIG. 12A-12G shows schematic side views of a simplified representation of the robot of FIG. 1, in use;
FIG. 13A-13G shows schematic side views of a simplified representation of the robot of FIG. 1, in use;
FIG. 14A-14O shows side views of the robot of FIG. 7, in use;
FIG. 15 shows a schematic side view of the robot of FIG. 1, in use;
FIG. 16A-16F shows schematic side views of a simplified representation of the robot of FIG. 1, in use; and
FIG. 17A-17I shows side views of the robot of FIG. 7, in use.

DESCRIPTION OF EXAMPLE EMBODIMENTS

FIGS. 1A-1B show a robot 1 according to an example embodiment. The robot comprises a body 100, carrying a first drive arrangement 10, a second drive arrangement 20 and a stabiliser 30. The robot further comprises actuators 40 operable to cause relative movement of the first drive arrangement 10, the second drive arrangement 20 and the stabiliser 30, and to drive the first drive arrangement 10 and the second drive arrangement 20.

In detail, the robot 1 is anthropomorphic in form. The body 100 comprises a first body section 110 carrying the first drive arrangement 10 and a second body section 120 carrying the second drive arrangement 20.

Particularly, the first body section 110 comprises a torso 112, a head 114 coupled to the torso 112 and a pair of arms 33A, 33B (not shown), coupled on opposed sides of the torso 112. The first drive arrangement 10 is carried by the torso 112.

The first drive arrangement 10 comprises two actuated wheels 12A, 12B (not shown). The first drive arrangement 10 is coupled linearly to the torso 112 to retractably extend therefrom. In this example, the movement of the first drive arrangement is provided by a prismatic actuation mechanism 14.

The second body section 120 comprises a thigh 126 coupled to the torso 112 at one end of the thigh 126 and a shank 128 coupled to an opposed end of the thigh 126. The second drive arrangement 20 is carried by the shank 128.

The second drive arrangement 20 comprises two actuated wheels 22A, 22B (not shown). In detail, the wheels 22A, 22B are a pair of differentially driven wheels. In this way, the robot 1 may turn by varying the speed of one wheel, for example the wheel 22A relative to that of the other wheel, for example the wheel 22B. In this way, the robot 1 may have a higher degree of mobility than, for example a steered robot. That is, the robot 1 may move along a relatively more demanding kinematic path.

The stabiliser 30 comprises a passive omnidirectional wheel 32. The omnidirectional wheel 32 has a relatively low lateral resistance and thus may not resist turning of, or otherwise adversely affect drive accuracy of the differentially driven wheels 22A, 22B. Further, the wheel 32 of the stabiliser 30 is coupled to the shank 128 by an actuated stabilising link 34 that on actuation causes a change in a wheelbase of the robot 1, thereby for example extending a polygon of stability of the robot 1. The stabiliser 30 further comprises the arms 33A, 33B. The arms 33A, 33B further comprise prismatic joints 35, enabling the robot 1 to, for example, pick up objects from the ground, or descend stairs or temporarily increase a size of the polygon of stability of the robot 1.

The robot 1 has 12 degrees of freedom (DOF), in which movement is provided by electrical and pneumatic actuators 40. Particularly, for joints requiring fast response times, accurate positioning low output torques, geared electric motor units are used. Conversely, for joints requiring compliance, large talks, high power to weight ratios or high levels of customisation, pneumatic air muscles (PAMs) are used. As will be appreciated by the person skilled in the art, the robot 1 may be provided with fewer DOF or more DOF.

FIG. 2A-2D show the robot of FIG. 1, in use.

Figure 2A:
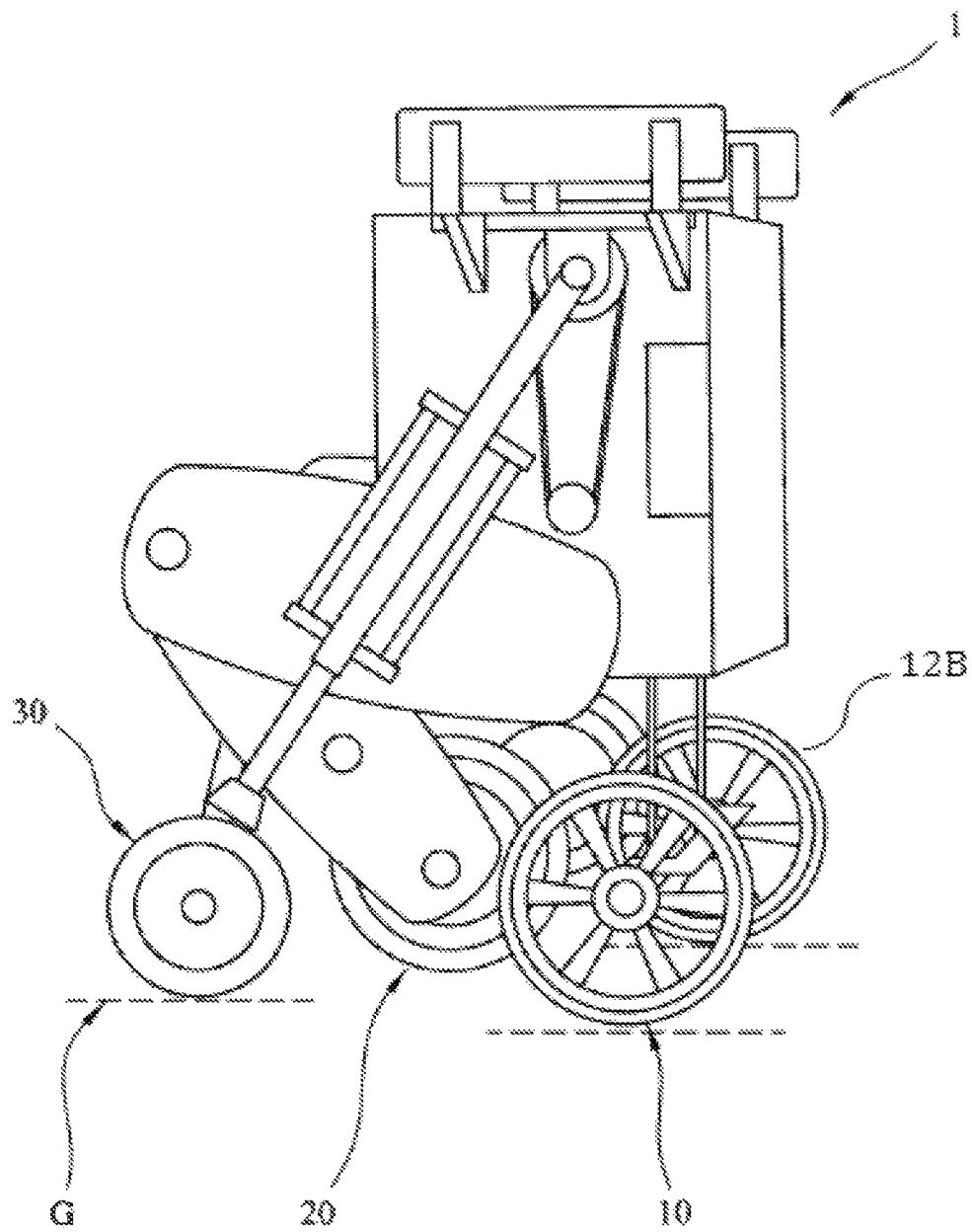

FIG. 2A shows the robot 1 arranged in the first configuration, in which the wheel 32 of the stabiliser 30 and the wheels 12A, 12B of the first drive arrangement 10 are arranged to contact the ground G. In particular, no other point of the robot 1 is in contact with the ground G. In this first configuration, the polygon of support of the robot 1 is thus defined by the wheel 32 of the stabiliser 30 and the wheels 12A, 12B of the first drive arrangement 10. Since the centre of gravity of the robot 1 is within this polygon of support, the robot 1 has static stability in the first configuration.

Figure 2B:
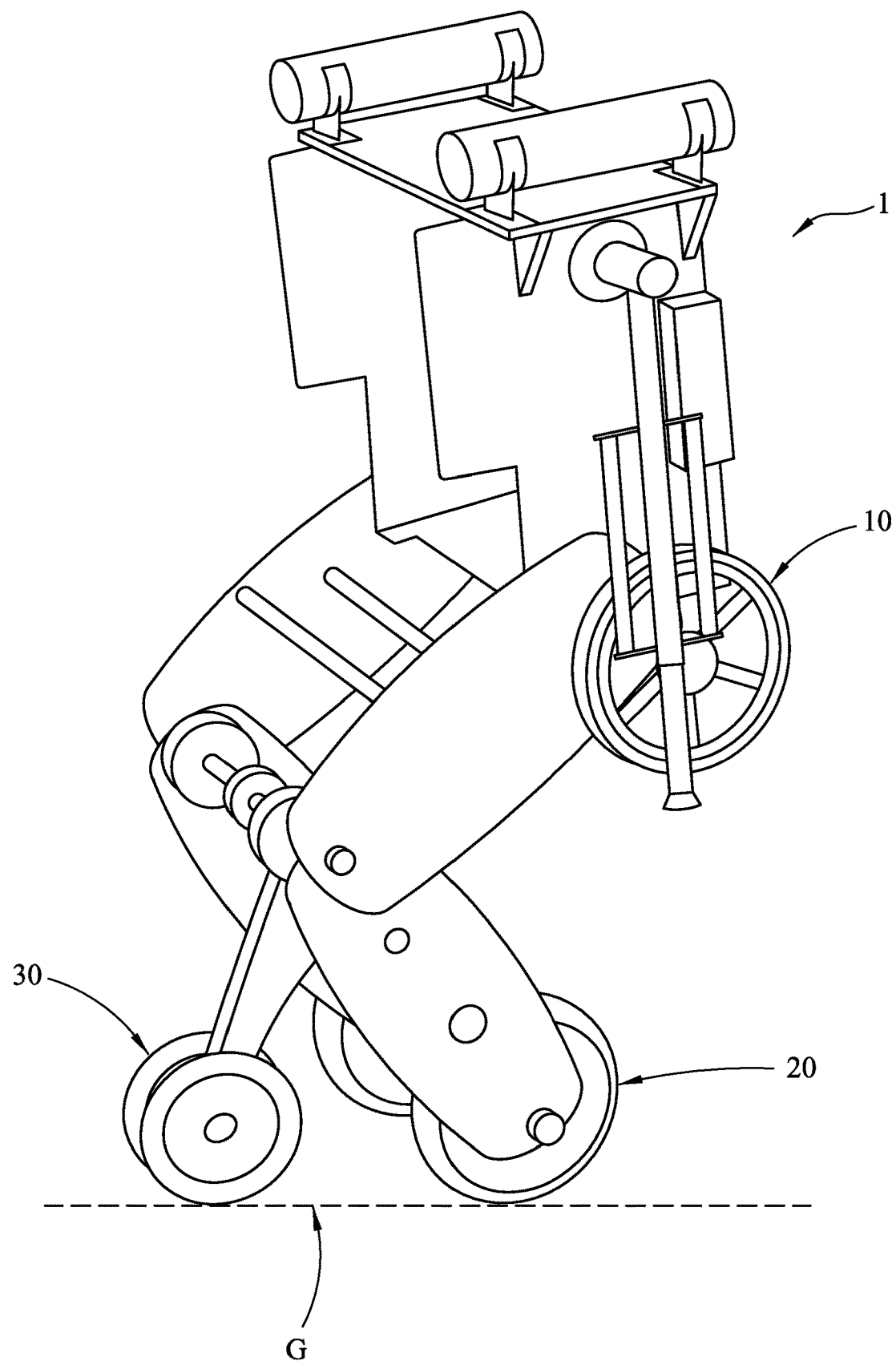

FIG. 2B shows the robot 1 arranged in the second configuration, in which the wheel 32 of the stabiliser 30 and the wheels 22A, 22B of the second drive arrangement 20 are arranged to contact the ground G. In particular, no other point of the robot 1 is in contact with the ground G. In this second configuration, the polygon of support of the robot 1 is thus defined by the wheel 32 of the stabiliser 30 and the wheels 22A, 22B of the second drive arrangement 20. Since the centre of gravity of the robot 1 is within this polygon of support, the robot 1 has static stability in the second configuration.

Figure 2C:
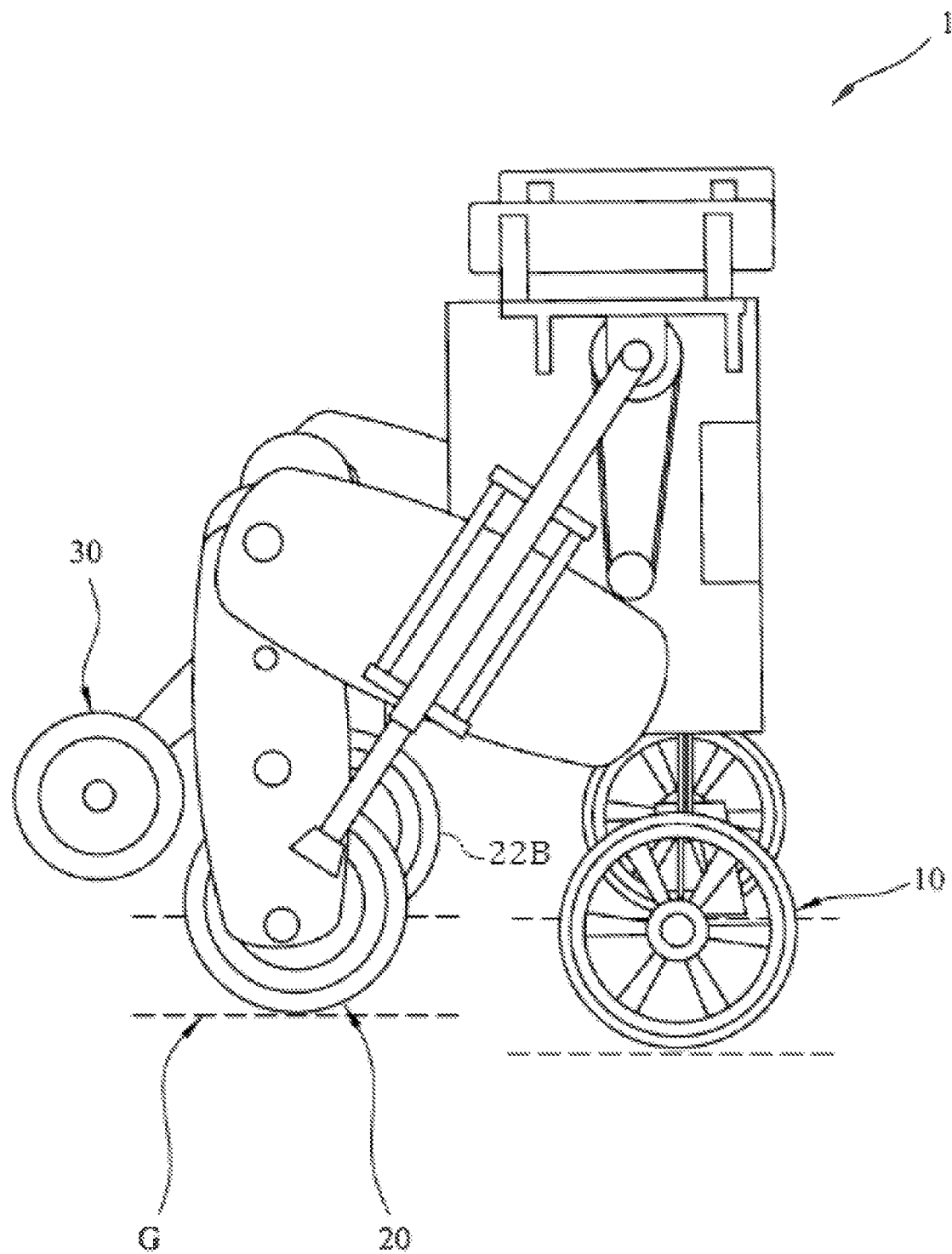

FIG. 2C shows the robot 1 arranged in the third configuration, in which the wheels 12A, 12B of the first drive arrangement 10 and the wheels 22A, 22B of the second drive arrangement 20 are arranged to contact the ground G. In particular, no other point of the robot 1 is in contact with the ground G. In this third configuration, the polygon of support of the robot 1 is thus defined by the wheels 12A, 12B of the first drive arrangement 10 and the wheels 22A, 22B of the second drive arrangement 20. Since the centre of gravity of the robot 1 is within this polygon of support, the robot 1 has static stability in the third configuration.

Figure 2D:
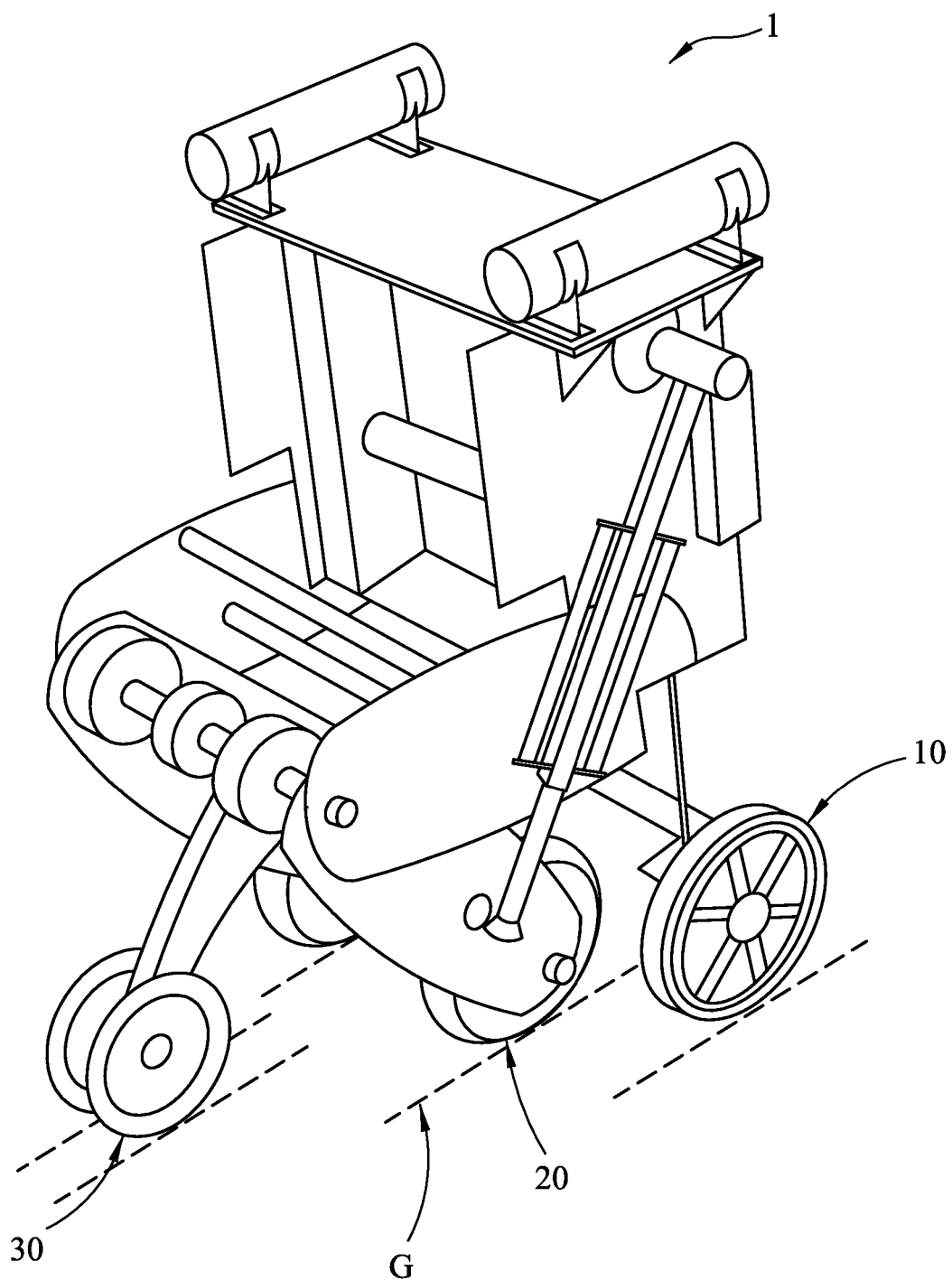

FIG. 2D shows the robot 1 arranged in the fourth configuration, in which the wheel 32 of the stabiliser 30, the wheels 12A, 12B of the first drive arrangement 10 and the wheels 22A, 22B of the second drive arrangement 20 are arranged to contact the ground G. In particular, no other point of the robot 1 is in contact with the ground G. In this fourth configuration, the polygon of support of the robot 1 is thus defined by the wheel 32 of the stabiliser 30, the wheels 12A, 12B of the first drive arrangement 10 and the wheels 22A, 22B of the second drive arrangement 20. Since the centre of gravity of the robot 1 is within this polygon of support, the robot 1 has static stability in the fourth configuration.

FIG. 3A-3B show extension/contraction of the arms 33A, 33B of the stabiliser 30. The arms 33A, 33B of the stabiliser 30 comprise pneumatic air muscles (not shown) and prismatic joints 35 (shown in FIG. 1A). In this way, the arms 33A, 33B of the stabiliser 30 are arranged to extend or contract. Thus, the arms 33A, 33B of the stabiliser 30 are arrangeable to provide, for example, support during movement by modifying the polygon of support of the robot 1, such that the robot 1 may maintain static stability.

FIGS. 4A-4B show the robot 1 during a stair climbing operation, such as ascending or descending stairs S having treads S1-S3. In particular, the robot 1 is arranged in the first configuration, in which the wheels 12A, 12B of the first drive arrangement 10 are arranged in contact with the tread S2 of the stairs S and the arms 33A, 33B of the stabiliser 30 are arranged in contact with the tread S1 of the stairs S. As shown in FIG. 4A, where the centre of gravity COG of the robot 1 is outside of the polygon of support of the robot 1, defined by the wheels 12A, 12B of the first drive arrangement 10 arranged in contact with the tread S2 of the stairs S and the arms 33A, 33B of the stabiliser 30 arranged in contact with the tread S1 of the stairs S, the robot 1 is statically unstable. In contrast, as shown in FIG. 4B, where the centre of gravity COG of the robot 1 is within or inside of the polygon of support of the robot 1, defined by the wheels 12A, 12B of the first drive arrangement 10 arranged in contact with the tread S2 of the stairs S and the arms 33A, 33B of the stabiliser 30 arranged in contact with the tread S1 of the stairs S, the robot 1 is statically stable.

FIG. 5A-5B shows extension and flexion of the second body section 120 during a stair climbing operation, such as ascending or descending stairs S having treads S1-S3. In particular, as shown in FIGS. 5A and 5B, the stair climbing operation may be limited by geometry of the robot 1 or the stairs S.

FIG. 6A-6F shows the robot 1 in use, traversing an obstacle O. Particularly, as shown in FIG. 6A, the robot 1 is arranged in the second configuration, in which the stabiliser 30 and the second drive arrangement 20 are arranged to contact the ground G. The robot 1 moves towards the obstacle O in a direction X and the wheels 22A, 22B of the second drive arrangement 20 contact the obstacle O. As shown in FIG. 6B, the actuation mechanism 14 extends the first drive arrangement 10 towards the obstacle O such that the wheels 12A, 12B of the first drive arrangement 10 contact the obstacle O. Continued extension of the actuation mechanism 14 lifts the second drive arrangement 20 above the ground G. In this way, the robot 1 is thus now arranged in the first configuration. As shown in FIG. 6C, retraction of the stabilising link 34 causes a centre of gravity of the robot 1 to be displaced in the direction X. As shown in FIG. 6D, continued retraction of the stabilising link 34 and driving of the wheels 12A, 12B of the first drive arrangement 10 further displaces the centre of gravity of the robot 1 in the direction X, such that the obstacle O is surmounted. Continued driving of the wheels 12A, 12B of the first drive moves the robot 1 in the direction X. As shown in FIG. 6E, extension of the arms 33A, 33B of the stabiliser 30 causes a centre of gravity of the robot 1 to be displaced in a direction opposed to the direction X, such that a more statically stable arrangement of the robot 1 is adopted. As shown in FIG. 6F, the actuation mechanism 14 retracts the first drive arrangement 10 away from the obstacle O such that the wheels 12A, 12B of the first drive arrangement 10 do not contact the obstacle O. In this way, the robot 1 reverts to the second configuration.

FIG. 7A-7H shows the robot 1 in use, traversing an obstacle O. Particularly, a height of the obstacle O is greater than a radius of the wheels 22A, 22B of the second drive arrangement 20 and a radius of the wheel 32 of the stabiliser 30. As shown in FIG. 7A, the robot 1 is arranged in the second configuration, in which the stabiliser 30 and the second drive arrangement 20 are arranged to contact the ground G. The robot 1 moves towards the obstacle O in a direction X. As shown in FIG. 7B, the robot 1 turns on the ground G such that the wheels 22A, 22B of the second drive arrangement 20 contact the obstacle O, rather than the wheel 32 of the stabiliser 30. As shown in FIG. 7C, the actuation mechanism 14 extends the first drive arrangement 10 towards the obstacle O such that the wheels 12A, 12B of the first drive arrangement 10 contact the obstacle O. Continued extension of the actuation mechanism 14 lifts the second drive arrangement 20 above the ground G. In this way, the robot 1 is thus now arranged in the first configuration. As shown in FIG. 7D, driving of the wheels 12A, 12B of the first drive arrangement 10 moves the robot 1 in the direction X until the wheels 22A, 22B of the second drive arrangement 20 contact the object O. As shown in FIG. 7E, driving of the wheels 12A, 12B of the first drive arrangement 10 or the wheels 22A, 22B of the second drive arrangement 20 moves the robot 1 in the direction X until the wheel 32 of the stabiliser 30 contacts the obstacle O. As shown in FIG. 7F, extension of the arms 33A, 33B of the stabiliser 30 causes a centre of gravity of the robot 1 to be displaced in the direction X. The actuation mechanism 14 retracts the first drive arrangement 10 away from the obstacle O such that the wheels 12A, 12B of the first drive arrangement 10 do not contact the obstacle O. In this way, the robot 1 reverts to the second configuration. As shown in FIG. 7G, continued retraction of the stabilising link 34, driving of the wheels 22A, 22B of the second drive arrangement 20 and extension of the arms 33A, 33B against the obstacle O further displaces the centre of gravity of the robot 1 in the direction X, such that the obstacle O is surmounted by the stabiliser 30. Continued driving of the wheels 22A, 22B of the second drive arrangement 20 further moves the robot 1 in the direction X. As shown in FIG. 7H, the arms 33A, 33B subsequently contract such that the arms 33A, 33B do not contact the obstacle O.

With reference to FIGS. 8-14, the robot 1 is arrangeable to ascend or descend stairs i.e. perform a stair climbing operation. Particularly, as described above, the robot 1 comprises the arms 33A, 33B that are arrangeable to provide ground-contacting support during stair-climbing. Further, the arms 33A, 33B are arrangeable to contact a stair tread rearwardly of the first drive arrangement 10 as the first drive arrangement 10 is raised toward the next stair tread in a first phase of stair climbing. In addition, the arms 33A, 33B are further arrangeable to contact the stair tread forwardly of the second drive arrangement 20 as the second drive arrangement 20 is driven forward and up onto the stair tread in a second phase of stair climbing. In this way, in both first and second phases of stair climbing, contact of the arms 33A, 33B of the stabiliser 30 on the stair tread provides the robot 1 with static stability.

Particularly, as shown in FIGS. 8-11, the robot 1 is arrangeable to ascend stairs through a repeated sequence of actions. For convenience, these actions may be divided into three stages: an approach stage, cycling stair-climbing stage and a recovery stage.

Figure 8A:
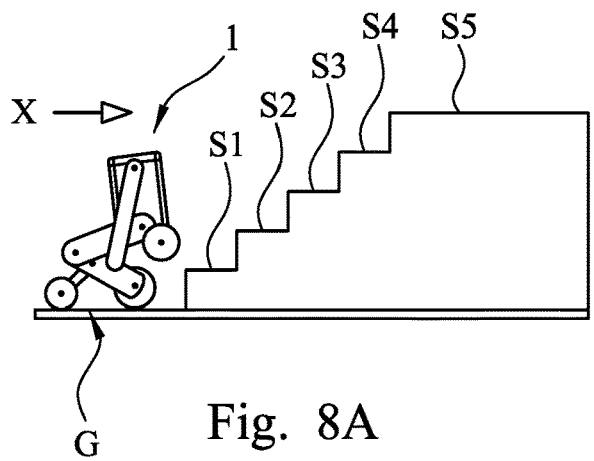
Figure 8B:
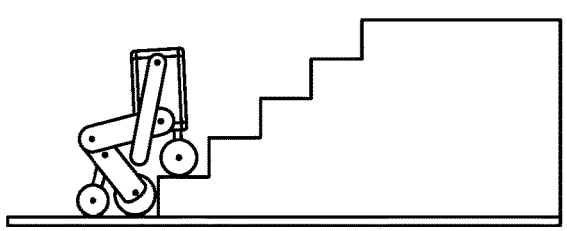
Figure 8C:
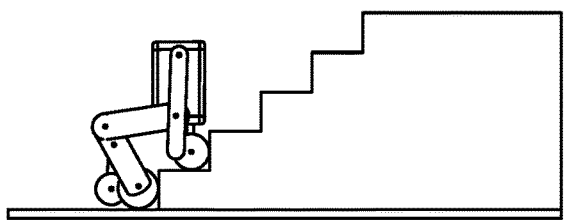
Figure 8D:
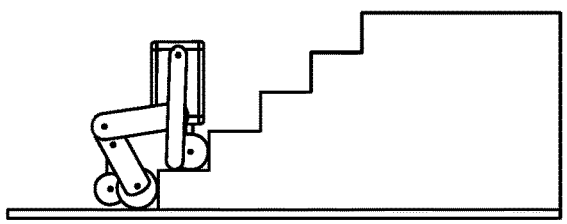
Figure 8E:
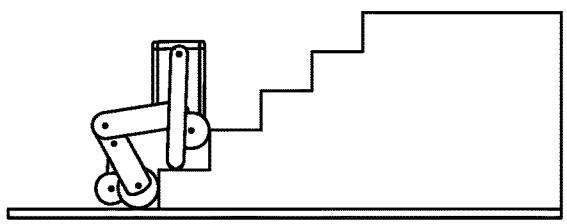
Figure 8F:
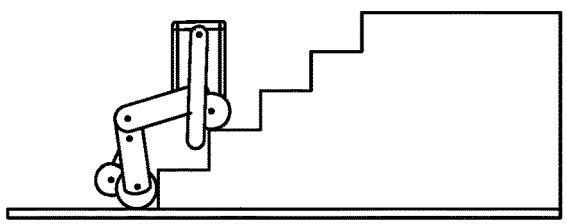
Figure 8G:
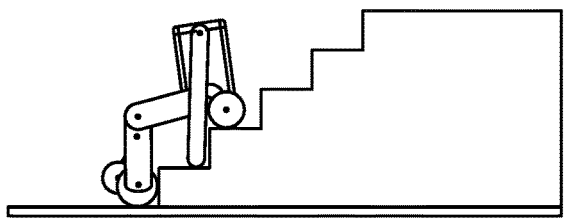
Figure 8H:
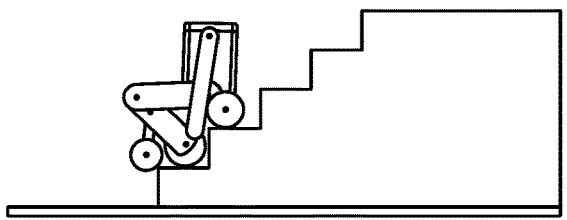

FIG. 8A-8H shows the robot 1 in use, during the approach stage of ascending stairs S. In this example, the stairs S comprise five treads S1-S5. As shown in FIG. 8A, the robot 1 is arranged in the second configuration, in which the stabiliser 30 and the second drive arrangement 20 are arranged to contact the ground G. The robot 1 moves towards the stairs S in a direction X and the wheels 22A, 22B of the second drive arrangement 20 contact a riser of the tread S1 of the stairs S. As shown in FIG. 8B, the actuation mechanism 14 extends the first drive arrangement 10 towards a first tread S1 of the stairs S such that the wheels 12A, 12B of the first drive arrangement 10 contact the first tread S1 of the stairs S. Further, retraction of the stabilising link 34 causes a centre of gravity of the robot 1 to be displaced in the direction X. As shown in FIG. 8C, the arms 33A, 33B are rotated over the first tread S1 of the stairs S. Further, articulation of the thigh 126 relative to the shank 128 tends to extend the second body section 120 such that the wheel 32 of the stabiliser 30 is raised above the ground G. In this way, the robot 1 is arranged in the third configuration. As shown in FIG. 8D, extension of the arms 33A, 33B against the first tread S1 of the stairs S tends to lift the first body section 110. In addition, the actuation mechanism 14 retracts the first drive arrangement 10 away from the first tread S1 of the stairs S such that the wheels 12A, 12B of the first drive arrangement 10 do not contact first tread S1 of the stairs S. As shown in FIG. 8E, the actuation mechanism 14 retracts the first drive arrangement 10 away from the first tread S1 of the stairs S such that the wheels 12A, 12B of the first drive arrangement 10 do not contact the first tread S1 of the stairs S. As shown in FIG. 8F, further articulation of the thigh 126 relative to the shank 128 tends to further extend the second body section 120 and driving of the wheels 12A, 12B of the first drive arrangement 10 further displaces the centre of gravity of the robot 1 in the direction X such that the wheels 12A, 12B of the first drive arrangement 10 are raised on to a second tread S2 of the stairs S, above the first tread S1 of the stairs S. As shown in FIG. 8G, extension of the arms 33A, 33B against the first tread S1 of the stairs S tends to lift the first body section 110 and further articulation of the thigh 126 relative to the shank 128 tends to further extend the second body section 120 and driving of the wheels 12A, 12B of the first drive arrangement 10 further displaces the centre of gravity of the robot 1 in the direction X such that the wheels 12A, 12B of the first drive arrangement 10 are driven on the second tread S2 of the stairs S. As shown in FIG. 8H, the first drive arrangement 10 is arranged on the second tread S2 of the stairs S and the second drive arrangement 20 is arranged on the first tread S1 of the stairs S, thereby completing the approach stage. That is, the robot 1 is arranged in in the third configuration, in which the first drive arrangement 10 is arranged to contact the ground on a first plane, for example the second tread S2 of the stairs S, and the second drive arrangement 20 is arranged to contact the ground on the second plane, for example the first tread S1 of the stairs S).

Figure 9A:
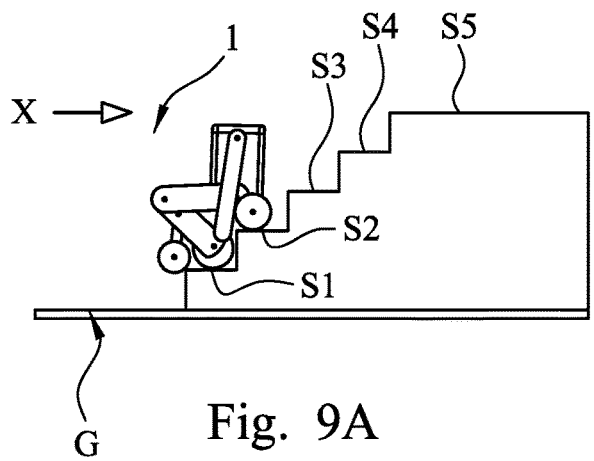
Figure 9B:
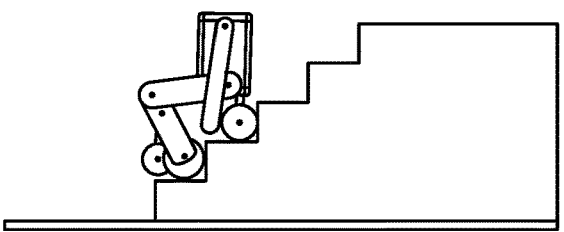
Figure 9C:
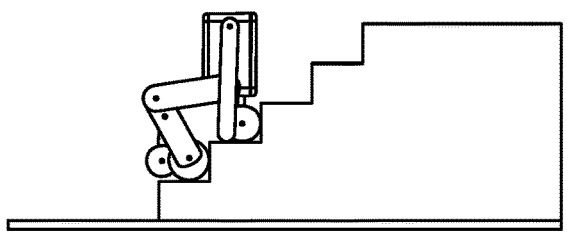
Figure 9D:
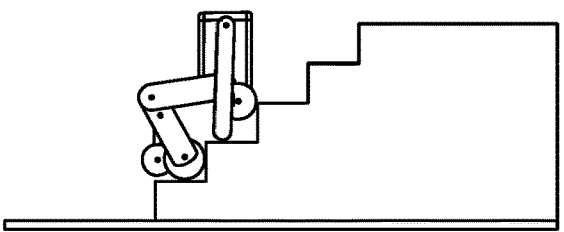
Figure 9E:
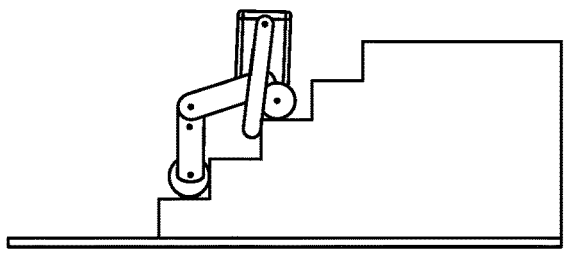
Figure 9F:
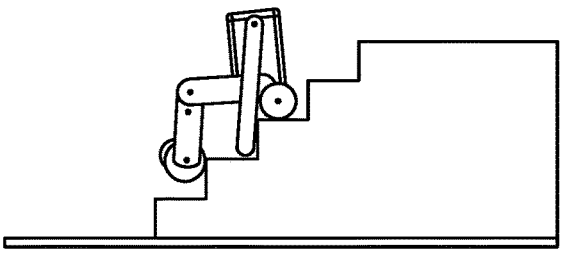
Figure 9G:
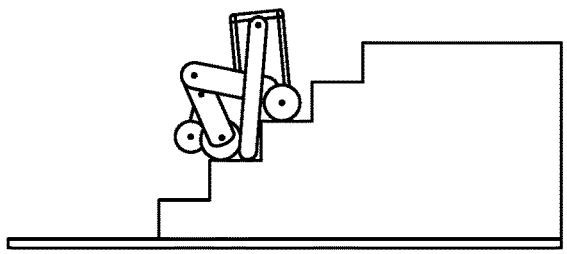
Figure 9H:
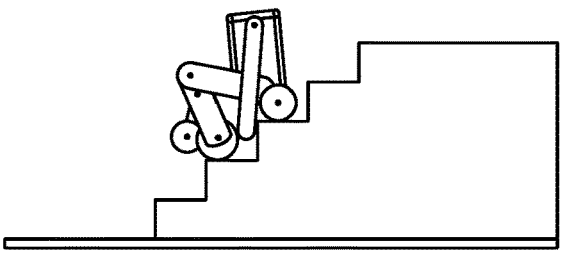

FIG. 9A-9H shows the robot 1 in use, during the cyclic stair-climbing stage of ascending the stairs S. As shown in FIG. 9A, the robot 1 is arranged in the third configuration, in which the first drive arrangement 10 is arranged on the second tread S2 of the stairs S and the second drive arrangement 20 is arranged on the first tread S1 of the stairs S. As shown in FIG. 9B, the actuation mechanism 14 extends the first drive arrangement 10 against the second tread S2 of the stairs S thereby tending to lift the first body section 110. As shown in FIG. 9C, the arms 33A, 33B are rotated over the second tread S2 of the stairs S. Further, extension of the arms 33A, 33B against the second tread S2 of the stairs S tends to further lift the first body section 110. As shown in FIG. 9D, the actuation mechanism 14 retracts the first drive arrangement 10 away from the second tread S2 of the stairs. As shown in FIG. 9E, articulation of the thigh 126 relative to the shank 128 tends to extend the second body section 120 and driving of the wheels 12A, 12B of the first drive arrangement 10 further displaces the centre of gravity of the robot 1 in the direction X such that the wheels 12A, 12B of the first drive arrangement 10 are raised on to a third tread S3 of the stairs S, above the second tread S2 of the stairs S. As shown in FIG. 9F, further articulation of the thigh 126 relative to the shank 128 tends to further extend the second body section 120 and driving of the wheels 12A, 12B of the first drive arrangement 10 further displaces the centre of gravity of the robot 1 in the direction X such that the wheels 12A, 12B of the first drive arrangement 10 are driven on the third tread S3 of the stairs S. The arms 33A, 33B remain in contact with the second tread S2 of the stairs S. As shown in FIG. 9G, articulation of the thigh 126 relative to the shank 128 tends to flex the second body section 120 and driving of the wheels 22A, 22B of the second drive arrangement 20 further displaces the centre of gravity of the robot 1 in the direction X such that the wheels 22A, 22B of the second drive arrangement 20 are raised on to the second tread S2 of the stairs S. The arms 33A, 33B remain in contact with the second tread S2 of the stairs S. As shown in FIG. 9H, the first drive arrangement 10 is arranged on the third tread S3 of the stairs S and the second drive arrangement 20 is arranged on the second tread S2 of the stairs S. That is, the robot 1 is arranged in in the third configuration, in which the first drive arrangement 10 is arranged to contact the ground on a first plane, for example the third tread S3 of the stairs S, and the second drive arrangement 20 is arranged to contact the ground on a second plane, for example the second tread S2 of the stairs S).

Figure 10A:
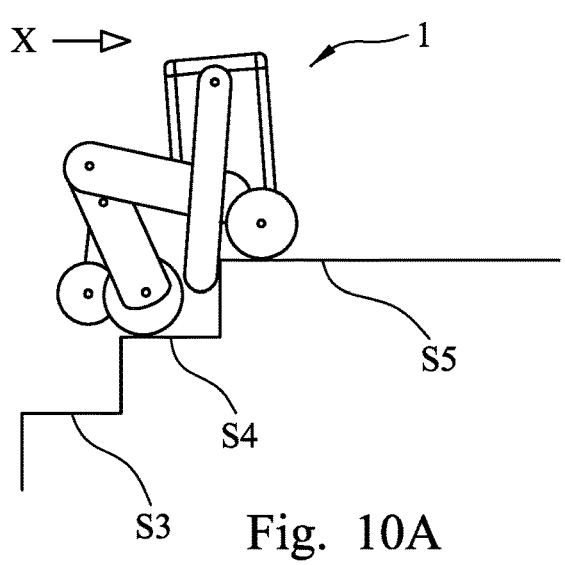
Figure 10B:
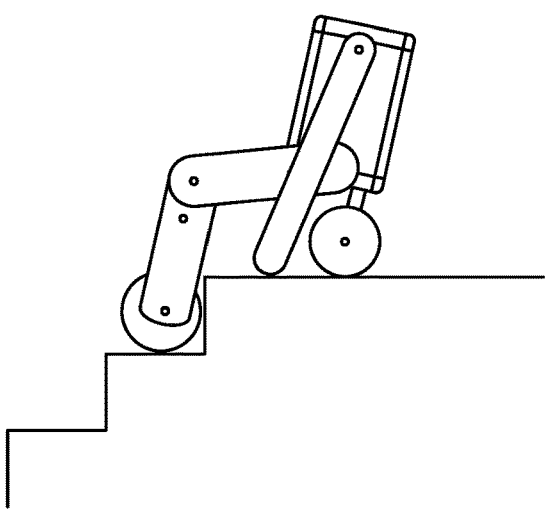
Figure 10C:
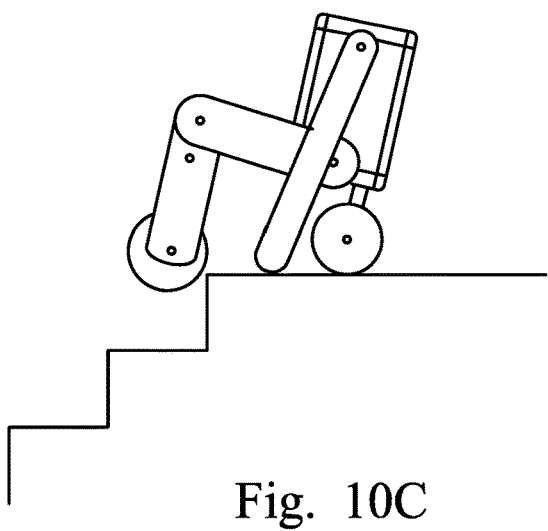
Figure 10D:
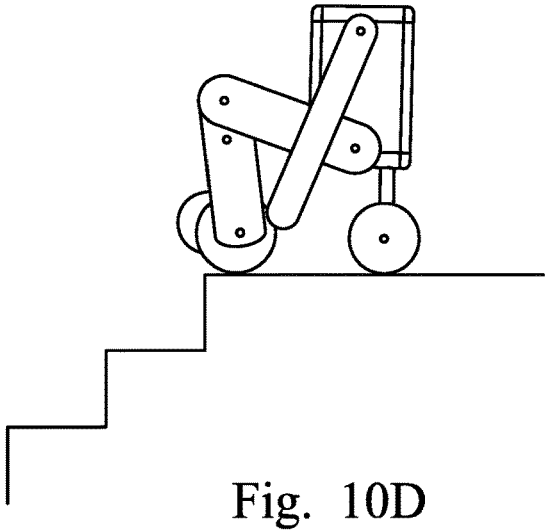
Figure 10E:
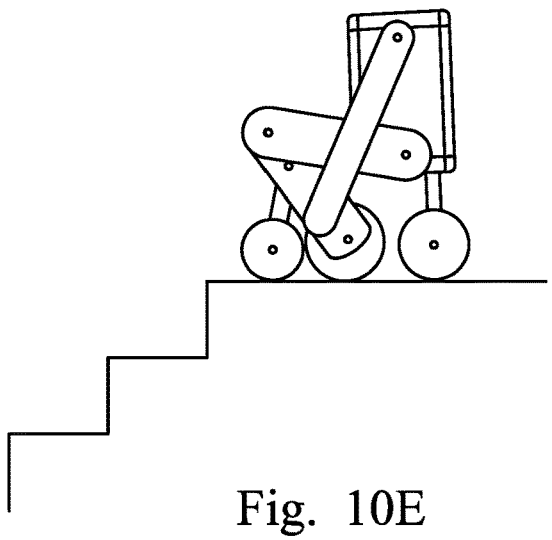
Figure 10F:
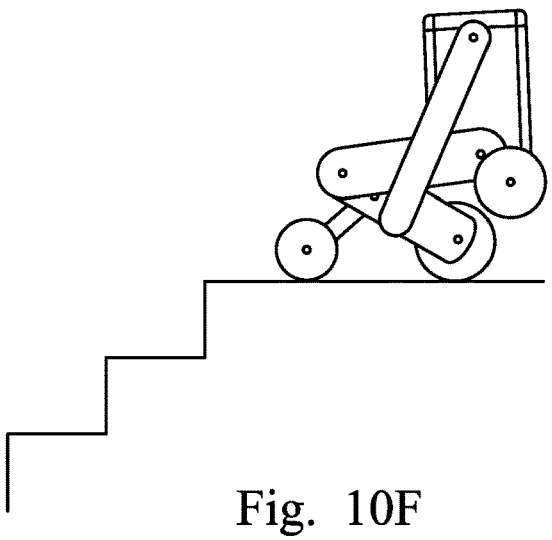

FIG. 10A-10H shows the robot 1 in use, during the recovery stage of ascending the stairs S. As shown in FIG. 10A, the robot 1 is arranged in the third configuration, in which the first drive arrangement 10 is arranged on the uppermost tread S5 of the stairs S and the second drive arrangement 20 is arranged on the tread S4 of the stairs S. As shown in FIG. 10B, the actuation mechanism 14 extends the first drive arrangement 10 against the tread S5 of the stairs S thereby tending to lift the first body section 110. In addition, articulation of the thigh 126 relative to the shank 128 tends to extend the second body section 120 and driving of the wheels 12A, 12B of the first drive arrangement 10, together with extension of the arms 33A, 33B against the tread S5 of the stairs S and retraction of the stabilising link 34, further displaces the centre of gravity of the robot 1 in the direction X. As shown in FIG. 10C, rotation of the second body section 120 relative to the first body section 110 lifts the second drive arrangement 20 above the tread S3 of the stairs S. As shown in FIG. 10D, articulation of the thigh 126 relative to the shank 128 tends to flex the second body section 120 and driving of the wheels 22A, 22B of the second drive arrangement 20 further displaces the centre of gravity of the robot 1 in the direction X such that the wheels 22A, 22B of the second drive arrangement 20 are raised on to the tread S5 of the stairs S. As shown in FIG. 10E, extension of the stabilising link 34 causes a centre of gravity of the robot 1 to be displaced in a direction opposed to the direction X, such that a more statically stable arrangement of the robot 1 is adopted. Continued articulation of the thigh 126 relative to the shank 128 tends to flex the second body section 120 and driving of the wheels 22A, 22B of the second drive arrangement 20 tends to further drive the robot 1 in the direction X. As shown in FIG. 10F, the actuation mechanism 14 retracts the first drive arrangement 10 away from the tread S5 of the stairs S such that the wheels 12A, 12B of the first drive arrangement 10 do not contact the tread S5 of the stairs S. In this way, the robot 1 reverts to the second configuration.

Figure 11M:
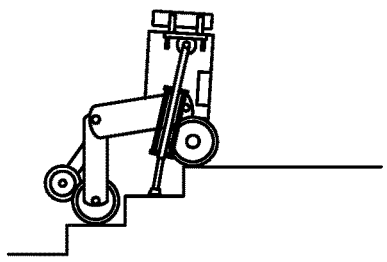
Figure 11N:
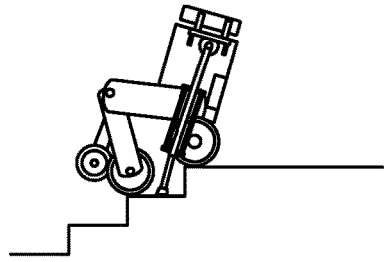
Figure 11O:
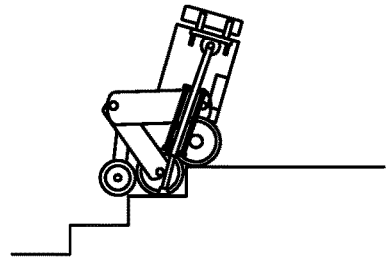
Figure 11P:
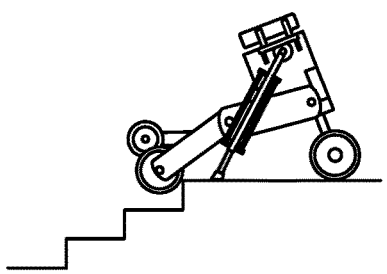
Figure 11Q:
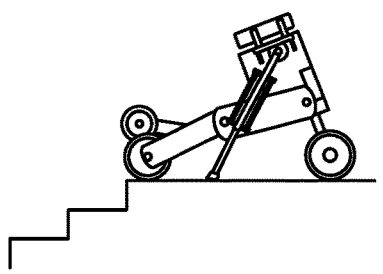
Figure 11R:
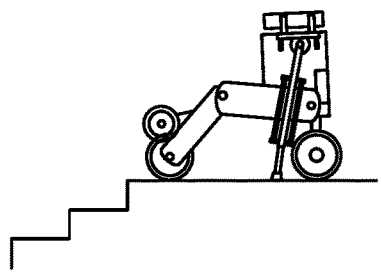
Figure 11S:
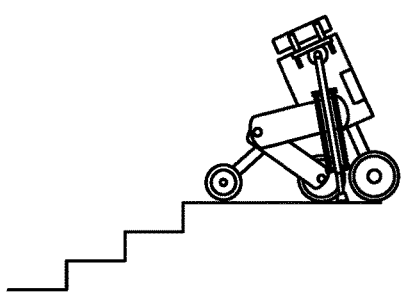
Figure 11T:
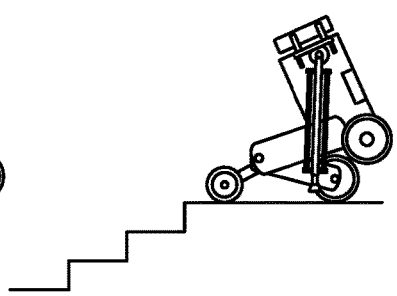

FIG. 11A-11T shows the robot 1 in use, ascending the stairs S. In this example, the stairs S comprise three treads S1-S3. Particularly, a riser height of the stairs S is greater than a radius of the wheels 22A, 22B of the second drive arrangement 20 and a radius of the wheel 32 of the stabiliser 30. FIG. 11A-11I corresponds to the approach stage of ascending the stairs S, as described previously with reference to FIGS. 8A-8H. Further, FIG. 11I-11O corresponds to the cycling stair-climbing stage of ascending the stairs S, as described previously with reference to FIG. 9A-9H. Additionally, FIG. 11O-11T corresponds with the recovery stage of ascending the stairs S, as described previously with reference to FIG. 8A-8H.

As shown in FIG. 11A, the robot 1 is arranged in the second configuration, in which the wheel 32 of the stabiliser 30 and the second drive arrangement 20 are arranged to contact the ground G. The robot 1 moves towards the stairs S in a direction X. As shown in FIG. 11B, the robot 1 turns on the ground G, such that the wheels 22A, 22B of the second drive arrangement 20, rather than the wheel 32 of the stabiliser 30, contact the riser of the stair S1 of the stairs S. As shown in FIG. 11C, the actuation mechanism 14 extends the first drive arrangement 10 towards the first tread S1 of the stairs S such that the wheels 12A, 12B of the first drive arrangement 10 contact the first tread S1 of the stairs S. As shown in FIG. 11D, retraction of the stabilising link 34 causes a centre of gravity of the robot 1 to be displaced in the direction X. As shown in FIG. 11E, the arms 33A, 33B of the stabiliser 30 are rotated over the first tread S1 of the stairs S and extended towards the first tread S1 of the stairs S, such that, extension of the arms 33A, 33B of the stabiliser 30 against the first tread S1 of the stairs S tends to lift the first body section 110. As shown in FIG. 11F, the actuation mechanism 14 retracts the first drive arrangement 10. As shown in FIG. 11G, articulation of the thigh 126 relative to the shank 128 tends to extend the second body section 120 while further extension of the arms 33A, 33B of the stabiliser 30 and driving of the wheels 12A, 12B of the first drive arrangement 10 further displaces the centre of gravity of the robot 1 in the direction X such that the wheels 12A, 12B of the first drive arrangement 10 are raised on to the second tread S2 of the stairs S, above the first tread S1 of the stairs S. As shown in FIG. 11H, further articulation of the thigh 126 relative to the shank 128 tends to further extend the second body section 120 while further extension of the arms 33A, 33B of the stabiliser 30 and driving of the wheels 12A, 12B of the first drive arrangement 10 further displaces the centre of gravity of the robot 1 in the direction X such that the wheels 12A, 12B of the first drive arrangement 10 are driven on the second tread S2 of the stairs S. As shown in FIG. 11I, articulation of the thigh 126 relative to the shank 128 tends to flex the second body section 120 and driving of the wheels 22A, 22B of the second drive arrangement 20 further displaces the centre of gravity of the robot 1 in the direction X such that the wheels 22A, 22B of the second drive arrangement 20 are raised on to the first tread S1 of the stairs S.

As shown in FIG. 11J, the first drive arrangement 10 is arranged on the second tread S2 of the stairs S and the second drive arrangement 20 is arranged on the first tread S1 of the stairs S. The actuation mechanism 14 extends the first drive arrangement 10 against the second tread S2 of the stairs S thereby tending to lift the first body section 110. As shown in FIG. 11K, the robot 1 is arranged in the third configuration, in which the first drive arrangement 10 is arranged on the second tread S2 of the stairs S and the second drive arrangement 20 is arranged on the first tread S1 of the stairs S. The extension of the arms 33A, 33B of the stabiliser 30 against the second tread S2 of the stairs S tends to further lift the first body section 110. As shown in FIG. 11L, the actuation mechanism 14 retracts the first drive arrangement 10. As shown in FIG. 11M, articulation of the thigh 126 relative to the shank 128 tends to extend the second body section 120 while further extension of the arms 33A, 33B of the stabiliser 30 and driving of the wheels 12A, 12B of the first drive arrangement 10 further displaces the centre of gravity of the robot 1 in the direction X such that the wheels 12A, 12B of the first drive arrangement 10 are raised on to a third tread S3 of the stairs S, above the second tread S2 of the stairs S. As shown in FIG. 11N, articulation of the thigh 126 relative to the shank 128 tends to flex the second body section 120 and driving of the wheels 22A, 22B of the second drive arrangement 20 further displaces the centre of gravity of the robot 1 in the direction X such that the wheels 22A, 22B of the second drive arrangement 20 are raised on to the second tread S2 of the stairs S. As shown in FIG. 11O, the first drive arrangement 10 is arranged on the third tread S3 of the stairs S and the second drive arrangement 20 is arranged on the second tread S2 of the stairs S. That is, the robot 1 is arranged in in the third configuration.

As shown in FIG. 11P, the actuation mechanism 14 extends the first drive arrangement 10 against the third tread S3 of the stairs S thereby tending to lift the first body section 110. In addition, articulation of the thigh 126 relative to the shank 128 tends to extend the second body section 120 and driving of the wheels 12A, 12B of the first drive arrangement 10, together with extension of the arms 33A, 33B of the stabiliser 30 against the third tread S3 of the stairs S, further displaces the centre of gravity of the robot 1 in the direction X. As shown in FIG. 11Q, driving of the wheels 12A, 12B of the first drive arrangement 10, together with extension of the arms 33A, 33B of the stabiliser 30 against the third tread S3 of the stairs S, further displaces the centre of gravity of the robot 1 in the direction X and tends to lifts the second drive arrangement 20 above the third tread S3 of the stairs S. As shown in FIG. 11R, articulation of the thigh 126 relative to the shank 128 flexes the second body section 120 and displaces the centre of gravity of the robot 1 in the direction X. As shown in FIG. 11S, further articulation of the thigh 126 relative to the shank 128 flexes the second body section 120 and extension of the stabilising link 34 causes a centre of gravity of the robot 1 to be displaced in a direction opposed to the direction X, such that a more statically stable arrangement of the robot 1 is adopted. As shown in FIG. 11T, the actuation mechanism 14 retracts the first drive arrangement 10 away from the third tread S3 of the stairs S such that the wheels 12A, 12B of the first drive arrangement 10 do not contact the third tread S3 of the stairs S. In this way, the robot 1 reverts to the second configuration.

Particularly, as shown in FIGS. 12-14, the robot 1 is arrangeable to descend stairs through a repeated sequence of actions. For convenience, as with ascending stairs as described above, these actions may be divided into three stages: an approach stage, cycling stair-climbing stage and a recovery stage. Movements of the robot 1 during descending stairs are typically a reverse of movements of the robot 1 during ascending stairs.

Figure 12A:
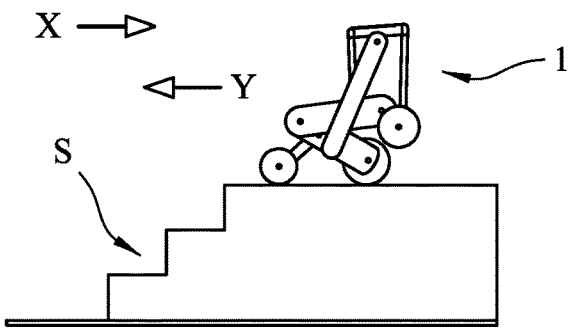
Figure 12B:
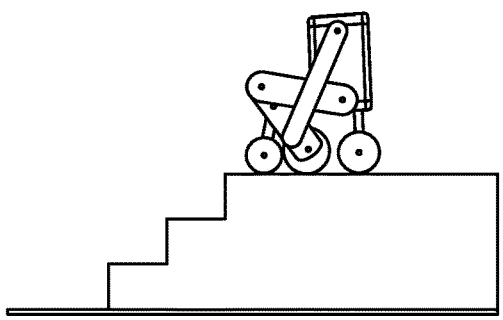
Figure 12C:
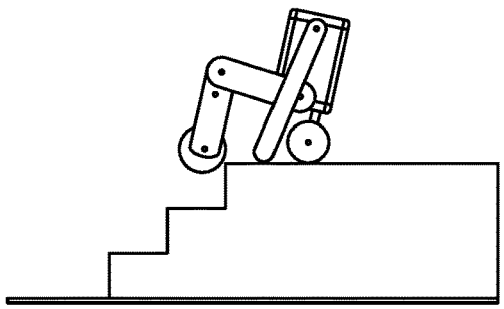
Figure 12D:
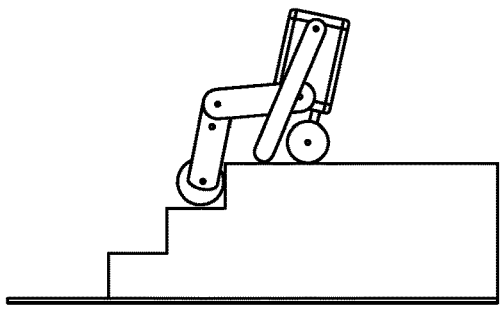
Figure 12E:
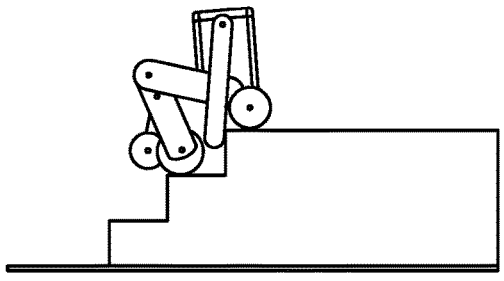
Figure 12F:
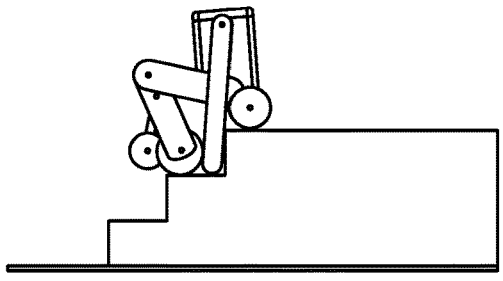
Figure 12G:
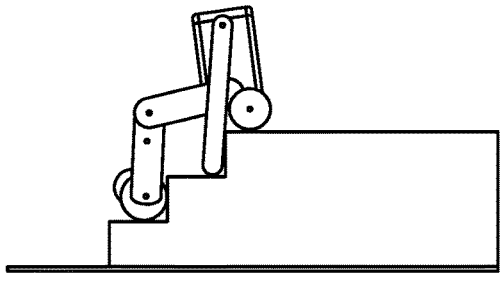

FIG. 12A-12G shows the robot 1 in use, during the approach stage of descending stairs S. In this example, the stairs S comprise three treads S1-S3. As shown in FIG. 12A, the robot 1 is arranged in the second configuration, in which the stabiliser 30 and the second drive arrangement 20 are arranged to contact the ground G. The robot 1 moves towards the stairs S in a direction Y. As shown in FIG. 12B, the actuation mechanism 14 extends the first drive arrangement 10 towards the third tread S3 of the stairs S such that the wheels 12A, 12B of the first drive arrangement 10 contact the third tread S3 of the stairs S. Further, retraction of the stabilising link 34 causes a centre of gravity of the robot 1 to be displaced in the direction X, opposed to direction Y. As shown in FIG. 12C, the arms 33A, 33B are rotated over the third tread S3 of the stairs S and elongated until they contact the ground G. Further, articulation of the thigh 126 relative to the shank 128 tends to extend the second body section 120 such that the wheel 32 of the stabiliser 30 is move over an edge of the tread S3 of the stairs S. As shown in FIG. 12D, articulation of the thigh 126 relative to the shank 128 tends to extend the second body section 120 such that the wheels 22A, 22B of the second drive arrangement 20 are lowered on to the second tread S2 of the stairs S, below the third tread S3 of the stairs S. As shown in FIG. 12E, articulation of the thigh 126 relative to the shank 128 tends to flex the second body section 120 while contraction of the actuation mechanism 14 and driving of the wheels 12A, 12B of the first drive arrangement 10 further displaces the centre of gravity of the robot 1 in the direction Y such that the wheels 12A, 12B of the first drive arrangement 10 are driven towards the edge of the tread S3 of the stairs S. As shown in FIG. 12F, the arms 33A, 33B of the stabiliser 30 are extended towards and contact the second tread S2 of the stairs S. As shown in FIG. 12G, articulation of the thigh 126 relative to the shank 128 tends to extend the second body section 120 and further displaces the centre of gravity of the robot 1 in the direction Y such that the wheels 22A, 22B of the second drive arrangement 20 are lowered on to the first tread S1 of the stairs S.

Figure 13A:
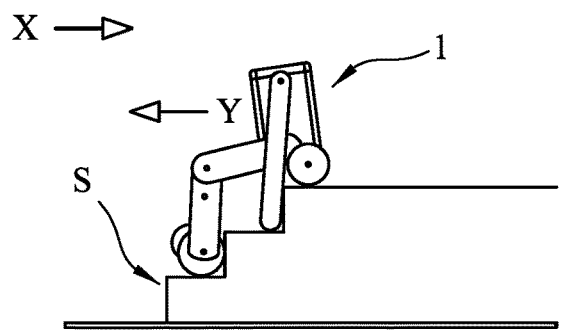
Figure 13B:
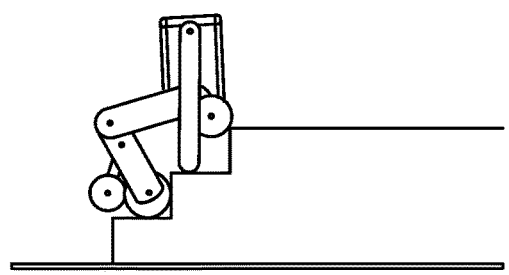
Figure 13C:
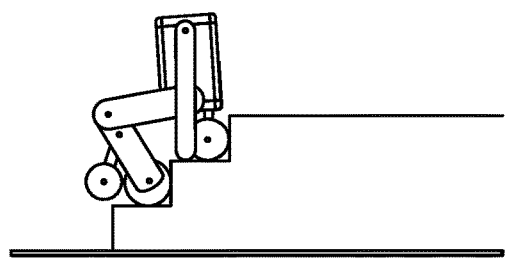
Figure 13D:
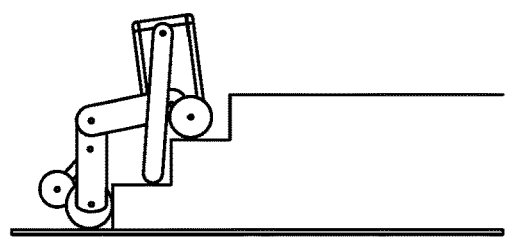
Figure 13E:
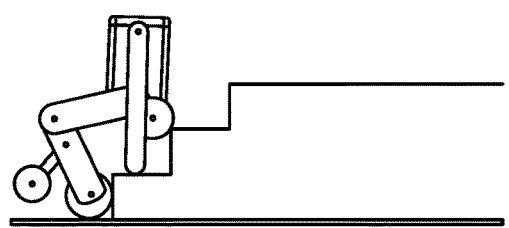
Figure 13F:
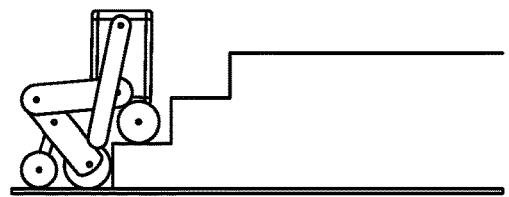
Figure 13G:
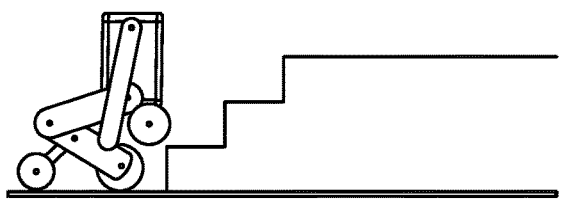

FIG. 13A-13H shows the robot 1 in use, during the cycling and recovery stages of descending the stairs S. As shown in FIG. 13A, the robot 1 is arranged in the third configuration, in which the first drive arrangement 10 is arranged on the third tread S3 of the stairs S and the second drive arrangement 20 is arranged on the second tread S2 of the stairs S. As shown in FIG. 13B, further displaces the centre of gravity of the robot 1 in the direction Y such that the first drive arrangement 10 is arranged over the edge of the third tread S3 of the stairs S. Hence, the robot 1 is arranged in in the second configuration, in which the second drive arrangement 20 is arranged to contact the ground on a first plane, for example the first tread S1 of the stairs S, and the stabiliser 30 is arranged to contact the ground on the second plane, for example the second tread S2 of the stairs S). As shown in FIG. 13C, the actuation mechanism 14 extends the first drive arrangement 10 until it contacts the tread S2. Then coordinated retraction of the arms 33A, 33B and retraction of the actuation mechanism 14 ensure that the body 110 descends fully to the second tread S2. In this way, the second drive arrangement 20 is lowered to the ground G. As shown in FIG. 13D, articulation of the thigh 126 relative to the shank 128 tends to flex the second body section 120 such that the wheels 12A, 12B of the first drive arrangement 10 are arranged over the edge of the tread S2 of the stairs S. As will be appreciated by the person skilled in the art, these movements of the robot 1 may be repeated such that the robot 1 may descend multiple treads. As shown in FIG. 13E, contraction of the arms 33A, 33B of the stabiliser 30 tends to lower the first body section 110 towards the first tread S1 of the stairs S such that the wheels 12A, 12B of the first drive arrangement 10 contact the first tread S1 of the stairs S. As shown in FIG. 13F, when the final stair is approached, continued articulation of the thigh 126 relative to the shank 128 tends to flex the second body section 120 such that the wheel 32 of the stabiliser 30 is arranged to contact the ground G. As shown in FIG. 13G, extension of the stabilising link 34 causes a centre of gravity of the robot 1 to be displaced in the direction Y, such that a more statically stable arrangement of the robot 1 is adopted. As shown in FIG. 13G, the robot 1 reverts to the second configuration.

FIG. 14A-14O shows the robot 1 in use, descending the stairs S. In this example, the stairs S comprise three treads S1-S3. Particularly, a riser height of the stairs S is greater than a radius of the wheels 22A, 22B of the second drive arrangement 20 and a radius of the wheel 32 of the stabiliser 30. FIG. 14A-14G corresponds to the approach stage of ascending the stairs S, as described previously with reference to FIG. 12A-12G. Further, FIG. 14H-14K to the cycling stair-climbing stage of descending the stairs S, as described previously with reference to FIG. 13A-13D. Additionally, FIG. 14I-14O corresponds with the recovery stage of ascending the stairs S, as described previously with reference to FIG. 13D-13G.

Figures 14D, 14E, 14F:
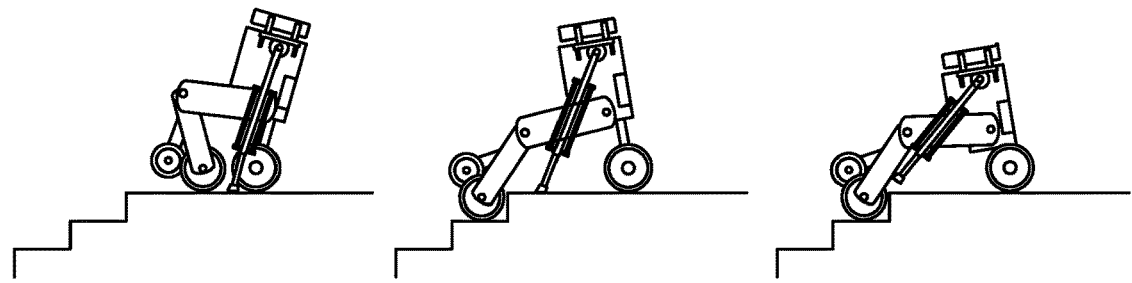
Figures 14G, 14H, 14I:
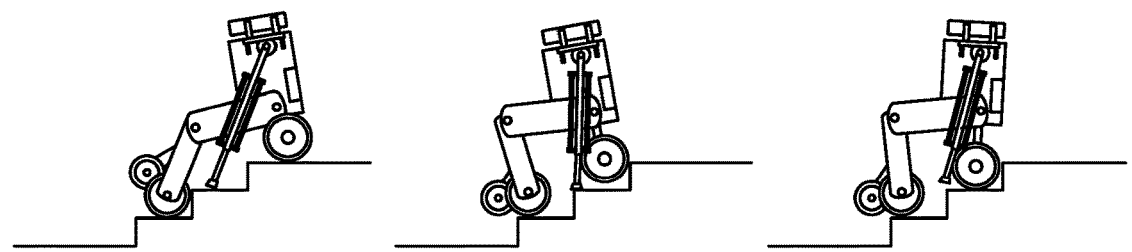

FIG. 14A-14G shows the robot 1 in use, during the approach stage of descending stairs S. As shown in FIG. 14A, the robot 1 is arranged in the second configuration, in which the wheel 32 of the stabiliser 30 and the second drive arrangement 20 are arranged to contact the ground G. The robot 1 moves towards the stairs S in a direction Y. As shown in FIG. 14B, the actuation mechanism 14 extends the first drive arrangement 10 towards the third tread S3 of the stairs S such that the wheels 12A, 12B of the first drive arrangement 10 contact the third tread S3 of the stairs S. As shown in FIG. 14C, the arms 33A, 33B of the stabiliser 30 are rotated over the third tread S3 of the stairs S and extended. Further, retraction of the stabilising link 34 causes a centre of gravity of the robot 1 to be displaced in the direction X, opposed to the direction Y. As shown in FIG. 14D, articulation of the thigh 126 relative to the shank 128 tends to flex the second body section 120 and together with further extension of the arms 33A, 33B of the stabiliser 30, the wheel 32 of the stabiliser 30 is raised above the third stair S3. As shown in FIG. 14E, articulation of the thigh 126 relative to the shank 128 tends to extend the second body section 120 such that the wheels 22A, 22B of the second drive arrangement 20 are lowered on to the second tread S2 of the stairs S, below the third tread S3 of the stairs S. As shown in FIG. 14F, articulation of the thigh 126 relative to the shank 128 tends to flex the second body section 120 while the actuation mechanism 14 is contracted, thereby lowering the first body section 110 towards the third tread S3 of the stairs S. As shown in FIG. 14G, the robot 1 moves in the direction Y towards the edge of the third tread S3 of the stairs S by driving of the wheels 12A, 12B of the first drive arrangement 10. The wheels 22A, 22B of the second drive arrangement 20 are lowered on to the first tread S1 of the stairs S while the arms 33A, 33B of the stabiliser are arranged in contact with the second tread S2 of the stairs S.

Figures 14J, 14K, 14L:
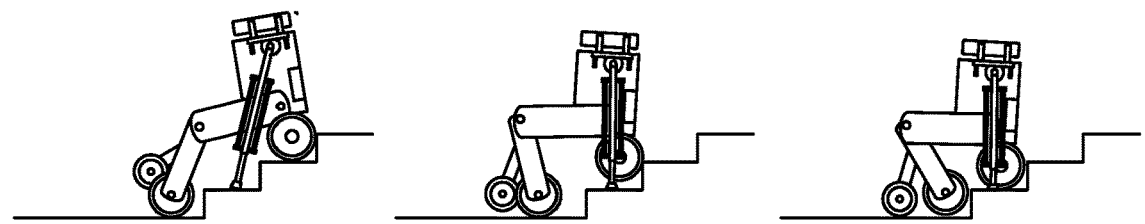

As shown in FIG. 14H, articulation of the thigh 126 relative to the shank 128 tends to flex the second body section 120 and further displaces the centre of gravity of the robot 1 in the direction Y such that the wheels 12A, 12B of the first drive arrangement 10 are lowered over the edge of the third tread S3 of the stairs S. As shown in FIG. 14I, the arms 33A, 33B of the stabiliser 30 are contracted such that the wheels 12A, 12B of the first drive arrangement 10 contact the second tread S2 of the stairs S. As shown in FIG. 14J, the arms 33A, 33B of the stabiliser 30 are extended towards and contact the first tread S1 of the stairs S. Further, articulation of the thigh 126 relative to the shank 128 tends to extend the second body section 120 and further displaces the centre of gravity of the robot 1 in the direction Y such that the wheels 22A, 22B of the second drive arrangement 20 are lowered on to the ground G. As shown in FIG. 14K, articulation of the thigh 126 relative to the shank 128 tends to flex the second body section 120 such that the wheels 12A, 12B of the first drive arrangement 10 are arranged over the edge of the tread S2 of the stairs S. As shown in FIG. 14L, contraction of the arms 33A, 33B of the stabiliser 30 tends to lower the first body section 110 towards the first tread S1 of the stairs S such that the wheels 12A, 12B of the first drive arrangement 10 contact the first tread S1 of the stairs S.

Continued articulation of the thigh 126 relative to the shank 128 tends to flex the second body section 120 such that the wheel 32 of the stabiliser 30 is arranged to contact the ground G. As shown in FIG. 14M, extension of the stabilising link 34 and articulation of the thigh 126 relative to the shank 128 causes a centre of gravity of the robot 1 to be displaced in the direction Y, such that a more statically stable arrangement of the robot 1 is adopted. As shown in FIGS. 14N and 14O, the robot 1 reverts to the second configuration.

As shown in FIG. 15, the robot 1 is better adapted to move across unevenness, for example soft, broken or undulating ground. Particularly, the first drive arrangement 10 is arrangeable to provide additional stability during such locomotion, by increasing the polygon of stability of the robot 1 when required, such that the robot 1 maintains static stability.

FIGS. 16 and 17 show the robot 1 in use, crossing a crevice.

Figure 16A:
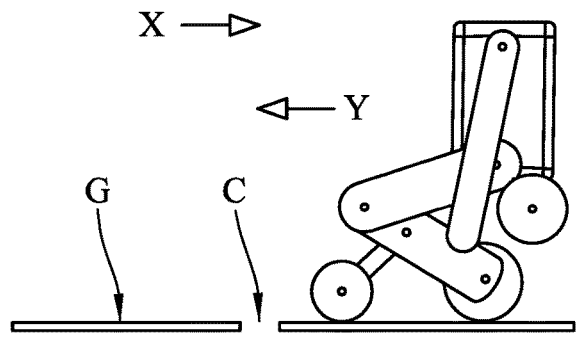
Figure 16B:
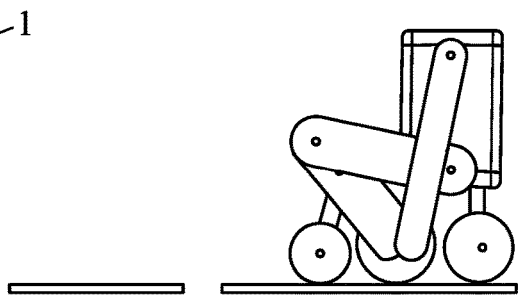
Figure 16C:
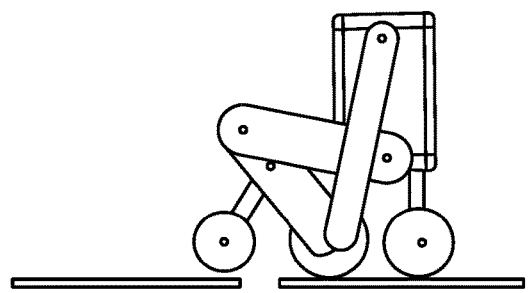
Figure 16D:
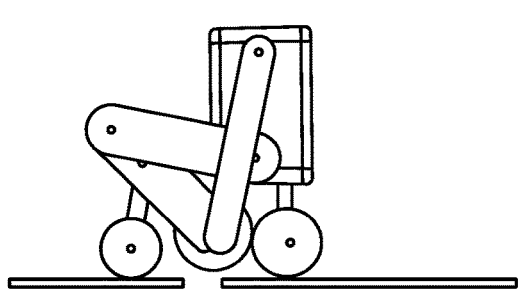
Figure 16E:
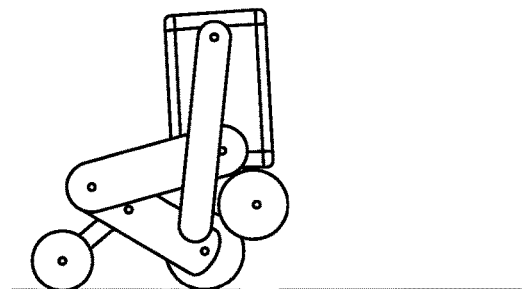
Figure 16F:
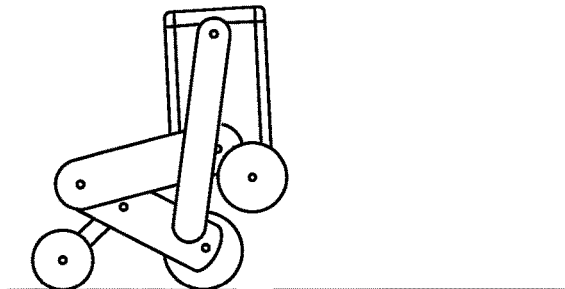

In detail, FIG. 16A-16F shows the robot 1 in use, crossing a crevice C in the ground G. As shown in FIG. 16A, the robot 1 is arranged in the second configuration, in which the wheel 32 of the stabiliser 30 and the wheels 22A, 22B of the second drive arrangement 20 are arranged to contact the ground G. The robot 1 moves towards the crevice C in a direction Y. As shown in FIG. 16B, the actuation mechanism 14 extends the first drive arrangement 10 towards the ground G and contraction of the stabilising link 34 causes a centre of gravity of the robot 1 to be displaced in the direction X, opposed to the direction Y, such that the wheels 12A, 12B of the first drive arrangement 10 contact the ground G. The robot 1 is thus arranged in the fourth configuration, in which the first drive arrangement 10, the second drive arrangement 20 and the wheel 32 of the stabiliser 30 are arranged to contact the ground. As shown in FIG. 16C, the wheel 32 of the stabiliser 30 is raised above the ground G. The robot 1 moves towards the crevice C in the direction Y such that the wheel 32 of the stabiliser 30 crosses over the crevice C. As shown in FIG. 16D, the wheel 32 of the stabiliser 30 is lowered to the ground G on the opposed side of the crevice C. Continued articulation of the thigh 126 relative to the shank 128 tends to flex the second body section 120 further such that the wheels 22A, 22B of the second drive arrangement 20 are raised above the ground G. As shown in FIG. 16E, the robot 1 moves in the direction Y such that the wheels 22A, 22B of the second drive arrangement 20 cross over the crevice C. The actuation mechanism 14 retracts the first drive arrangement 10 such that the wheels 22A, 22B of the second drive arrangement 20 are lowered to the ground G on the opposed side of the crevice C. Further retraction of the actuation mechanism 14 retracts the first drive arrangement 10 such that the wheels 12A, 12B of the first drive arrangement 10 are raised above the ground G. As shown in FIG. 16F, the robot 1 is arranged in the second configuration on the opposed side of the crevice C.

Figure 17A:
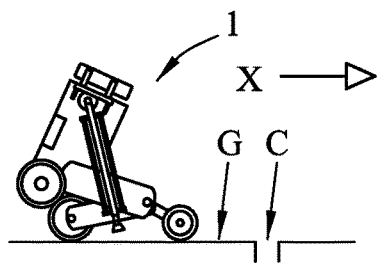
Figure 17B:
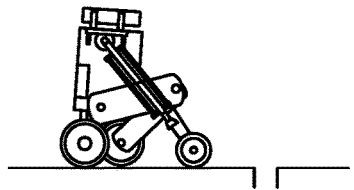
Figure 17C:
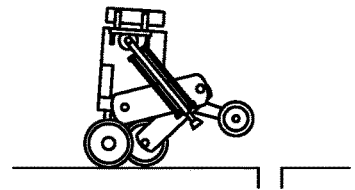
Figure 17D:
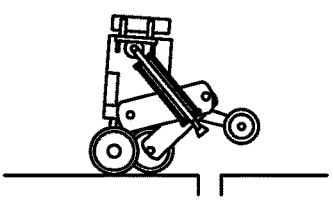
Figure 17E:
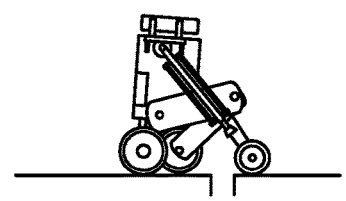
Figure 17F:
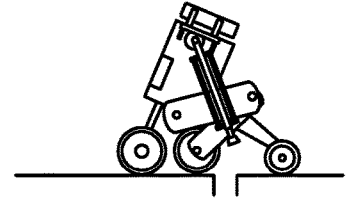
Figure 17G:
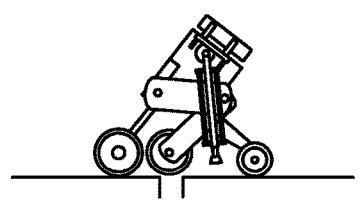
Figure 17H:
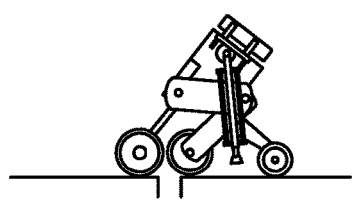
Figure 17I:
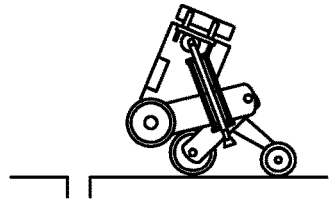

In detail, FIG. 17A-17I shows the robot 1 in use, crossing the crevice C in the ground G. As shown in FIG. 17A, the robot 1 is arranged in the second configuration, in which the wheel 32 of the stabiliser 30 and the wheels 22A, 22B of the second drive arrangement are arranged to contact the ground G. The robot 1 moves towards the crevice C in a direction X. As shown in FIG. 17B, the actuation mechanism 14 extends the first drive arrangement 10 towards the ground G, such that the wheels 12A, 12B of the first drive arrangement 10 contact the ground G. The robot 1 is thus arranged in the fourth configuration, in which the first drive arrangement 10, the second drive arrangement 20 and the wheel 32 of the stabiliser 30 are arranged to contact the ground. As shown in FIG. 17C, the wheel 32 of the stabiliser 30 is raised above the ground G. As shown in FIG. 17D, the robot 1 moves towards the crevice C in the direction X such that the wheel 32 of the stabiliser 30 crosses over the crevice C. As shown in FIG. 16E, the wheel 32 of the stabiliser 30 is lowered to the ground G on the opposed side of the crevice C. As shown in FIG. 17F, articulation of the first body section 110 relative to the second body section displaces the centre of gravity of the robot 1 in the direction X. Further, the wheels 22A, 22B of the second drive arrangement 20 are arranged above the ground G. As shown in FIG. 17G, the robot 1 moves in the direction X such that the wheels 22A, 22B of the second drive arrangement 20 cross the crevice C. As shown in FIG. 17H, the robot 1 moves in the direction X such that the wheels 22A, 22B of the second drive arrangement 20 cross over the crevice C. As shown in FIG. 17I, the actuation mechanism 14 retracts the first drive arrangement 10 such that the wheels 22A, 22B of the second drive arrangement 20 are lowered to the ground G on the opposed side of the crevice C. Further retraction of the actuation mechanism 14 retracts the first drive arrangement 10 such that the wheels 12A, 12B of the first drive arrangement 10 are raised above the ground G. As shown in FIG. 17I, the robot 1 is arranged in the second configuration on the opposed side of the crevice C.

In summary, the robot is arrangeable to better move across obstacles, such as stairs, in human environments, such as indoor environments. Particularly, since the robot is arrangeable in the first, second and third configurations each having static stability, the robot may maintain static stability during locomotion, for example, across objects. Since the first, second and third configurations each have static stability, active control of the robot is not required to maintain an orientation in these configurations. In this way a control requirement, for example a computational requirement, may be reduced or sensors required for active control may not be required. Furthermore, since active control may not be required and thus actuation of the actuators may not be required so as to maintain stability, energy consumption of the robot may be reduced.

Herein, a term 'or' includes terms 'and' and 'or' i.e. and/or. For example, 'A or B' includes 'A only', 'B only' and 'both A and B'.

Although a few preferred embodiments have been shown and described, it will be appreciated by those skilled in the art that various changes and modifications might be made without departing from the scope of the invention, as defined in any appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:
1. A robot comprising:
a body carrying a first drive arrangement, a second drive arrangement and a stabiliser; and further comprising actuators operable to cause relative movement of the first drive arrangement, the second drive arrangement and the stabiliser, and to drive the first and the second drive arrangements;
wherein the robot is arrangeable in first, second and third configurations each having static stability, such that:
in the first configuration, the stabiliser and the first drive arrangement are arranged to contact the ground;
in the second configuration, the stabiliser and the second drive arrangement are arranged to contact the ground; and
in the third configuration, the first and the second drive arrangements are arranged to contact the ground;
characterized in that no other ground contacting point is involved in conferring said static stability in said configurations wherein the body comprises:
a first body section carrying the first drive arrangement; and
a second body section carrying the second drive arrangement;
wherein the actuators are operable to cause relative movement of the body sections;

wherein:
in the first configuration, the stabiliser is arranged to contact the ground either forwardly or rearwardly of the first drive arrangement; and
in the second configuration, the stabiliser is arranged to contact the ground either forwardly or rearwardly of the second drive arrangement,
wherein the first body section comprises a torso and the stabiliser, comprising an omnidirectional wheel and an arm, comprising a prismatic joint, rotatably coupled on a side of the torso;
wherein the first drive arrangement comprises an actuated wheel and wherein the second drive arrangement comprises an actuated wheel;
wherein the robot is operable to perform an obstacle crossing operation, wherein:
the stabiliser is arrangeable to provide ground-contacting support during first and second phases of obstacle crossing;
wherein:
the stabiliser is arrangeable to contact the ground rearwardly of the second drive arrangement as the first drive arrangement passes over an obstacle in the first phase of obstacle crossing; and
the first drive arrangement is arrangeable to contact the ground beyond the obstacle, forwardly of the second drive arrangement, as the second drive arrangement passes over the obstacle in the second phase of obstacle crossing;
such that in both the first and second phases of obstacle crossing, contact of the stabiliser on the ground provides the robot with static stability.

2. A robot according to claim 1, wherein:
the robot is driveable in the first, the second and the third configurations.

3. A robot according to claim 1, wherein:
in the first configuration, the stabiliser is arranged to contact the ground on a first plane and the first drive arrangement is arranged to contact the ground on a second plane;
in the second configuration, the stabiliser is arranged to contact the ground on the first plane and the second drive arrangement is arranged to contact the ground on the second plane; and
in the third configuration, the first drive arrangement is arranged to contact the ground on the first plane and the second drive arrangement is arranged to contact the ground on the second plane.

4. A robot according to claim 3, wherein:
the first plane and the second plane are coincident.

5. A robot according to claim 1, wherein:
the first drive arrangement is carried on a mount that is extensible from the body.

6. A robot according to claim 1, wherein the robot is operable to perform a stair climbing operation, wherein:
the stabiliser comprises the arm that is arrangeable to provide ground-contacting support during stair-climbing;
wherein:
the arm is arrangeable to contact a stair tread rearwardly of the first drive arrangement as the first drive arrangement is raised toward a next stair tread in a first phase of stair climbing; and
the arm is further arrangeable to contact the stair tread forwardly of the second drive arrangement as the second drive arrangement is driven forward and up onto the stair tread in a second phase of stair climbing;
such that in both the first and second phases of stair climbing, contact of the arm on the stair tread provides the robot with static stability.

7. A robot according to claim 1, wherein the robot is arrangeable in a fourth configuration having static stability, wherein:
in the fourth configuration, the first drive arrangement and the second drive arrangement are arranged to contact the ground; and
the stabiliser is arranged to contact the ground.

8. A robot according to claim 7, wherein the robot is driveable in the fourth configuration.

9. A method of operating a robot, the robot comprising:
a body carrying a first drive arrangement, a second drive arrangement, and a stabiliser; and further comprising actuators operable to cause relative movement of the first drive arrangement, the second drive arrangement and the stabiliser, and to drive the first and the second drive arrangements;
wherein the robot is arrangeable in first, second and third configurations each having static stability;
the method comprising:
in the first configuration, arranging the stabiliser and the first drive arrangement to contact the ground;
in the second configuration, arranging the stabiliser and the second drive arrangement to contact the ground; and
in the third configuration, arranging the first and the second drive arrangements to contact the ground;
characterized in that no other ground contacting point is involved in conferring said static stability in said configurations;
wherein the body comprises:
a first body section carrying the first drive arrangement; and
a second body section carrying the second drive arrangement;
wherein the actuators are operable to cause relative movement of the body sections;
wherein:
in the first configuration, the stabiliser is arranged to contact the ground either forwardly or rearwardly of the first drive arrangement; and
in the second configuration, the stabiliser is arranged to contact the ground either forwardly or rearwardly of the second drive arrangement;
wherein the first body section comprises a torso and the stabiliser, comprising an omnidirectional wheel and an arm, comprising a prismatic joint, rotatably coupled on a side of the torso;
wherein the first drive arrangement comprises an actuated wheel and wherein the second drive arrangement comprises an actuated wheel;
wherein the robot is operable to perform an obstacle crossing operation, wherein:
the stabiliser is arrangeable to provide ground-contacting support during first and second phases of obstacle crossing;
wherein the method comprises:
arranging the stabiliser to contact the ground rearwardly of the second drive arrangement as the first drive arrangement passes over an obstacle in the first phase of obstacle crossing; and
arranging the first drive arrangement to contact the ground beyond the obstacle, forwardly of the second drive arrangement, as the second drive arrangement passes over the obstacle in the second phase of obstacle crossing;

such that in both the first and second phases of obstacle crossing, contact of the stabiliser on the ground provides the robot with static stability.

10. A method according to claim 9, wherein the method comprises:

driving the robot in the first, the second or the third configurations.

11. A method according to claim 9, wherein:

in the first configuration, the arranging comprises arranging the stabiliser to contact the ground on a first plane and arranging the first drive arrangement to contact the ground on a second plane;

in the second configuration, the arranging comprises arranging the stabiliser to contact the ground on the first plane and arranging the second drive arrangement to contact the ground on the second plane; and in the third configuration, the arranging comprises arranging the first drive arrangement to contact the ground on the first plane and arranging the second drive arrangement to contact the ground on the second plane.

12. A method according to claim 11, wherein:

the first plane and the second plane are coincident.

13. A method according to claim 9, wherein:

the first drive arrangement is carried on a mount that is extensible from the body.

14. A method according to claim 9, wherein the robot is operable to perform a stair climbing operation, wherein:

the stabiliser comprises the arm that is arrangeable to provide ground-contacting support during stair-climbing;

wherein the method comprises:

arranging the arm to contact a stair tread rearwardly of the first drive arrangement as the first drive arrangement is raised toward a next stair tread in a first phase of stair climbing; and arranging the arm to contact the stair tread forwardly of the second drive arrangement as the second drive arrangement is driven forward and up onto the stair tread in a second phase of stair climbing;

such that in both the first and second phases of stair climbing, contact of the arm on the stair tread provides the robot with static stability.

15. A method according to claim 9, wherein the robot is arrangeable in a fourth configuration having static stability, wherein the method comprises:

in the fourth configuration, arranging the first drive arrangement and the second drive arrangement to contact the ground; and arranging the stabiliser to contact the ground.

16. A method according to claim 15, wherein the method comprises driving the robot in the fourth configuration.

* * * * *